US010230907B2

(12) United States Patent
Wang

(10) Patent No.: US 10,230,907 B2
(45) **Date of Patent: *Mar. 12, 2019**

(54) THERMAL IMAGING DEVICE AND NORMATIVE PHOTOGRAPHING METHOD FOR THERMAL IMAGE

(71) Applicant: MISSION INFRARED ELECTRO OPTICS TECHNOLOGY CO., LTD, Hangzhou, Zhejiang (CN)

(72) Inventor: Hao Wang, Hangzhou (CN)

(73) Assignee: MISSION INFRARED ELECTRO OPTICS TECHNOLOGY CO., LTD, Hangzhou (CN)

( * ) Notice: Subject to any disclaimer, the term of this patent is extended or adjusted under 35 U.S.C. 154(b) by 182 days.

This patent is subject to a terminal disclaimer.

(21) Appl. No.: 14/371,440

(22) PCT Filed: Jan. 10, 2013

(86) PCT No.: PCT/CN2013/070341

§ 371 (c)(1),
(2) Date: Jul. 10, 2014

(87) PCT Pub. No.: WO2013/104328

PCT Pub. Date: Jul. 18, 2013

(65) Prior Publication Data

US 2015/0009336 A1 Jan. 8, 2015

(30) Foreign Application Priority Data

Jan. 12, 2012 (CN) .......................... 2012 1 0008102
Jan. 12, 2012 (CN) .......................... 2012 1 0008402
Sep. 21, 2012 (CN) .......................... 2012 1 0355375

(51) Int. Cl.

| | |
|---|---|
| ***G01J 5/00*** | (2006.01) |
| ***H04N 5/33*** | (2006.01) |
| ***H04N 5/232*** | (2006.01) |

(52) U.S. Cl.
CPC ........... *H04N 5/33* (2013.01); *H04N 5/23222* (2013.01); *H04N 5/23229* (2013.01); *H04N 5/23293* (2013.01); *G01J 2005/0077* (2013.01)

(58) Field of Classification Search
USPC .......................................................... 348/165
See application file for complete search history.

(56) References Cited

U.S. PATENT DOCUMENTS 6,664,956 B1 * 12/2003 Erdem .................... G06T 17/20 345/419
2009/0015702 A1 * 1/2009 Garcia Alonso ... H04N 5/23222 348/333.02

(Continued)

OTHER PUBLICATIONS

ENVI(ENVI User's Guide, ENVI Version 4.1, Research Systems Inc., Sep. 2004 Edition).*

*Primary Examiner* — Behrooz M Senfi
*Assistant Examiner* — Ana Picon-Feliciano

(57) ABSTRACT

This invention provides a thermal imaging device and a normative photographing method for a thermal image. In the prior art, when the thermal imaging device is used, a photographing part, angle, and distance of a photographed object are selected according to subjective experience of users, thus lowering photographing speeds and having omissions, and a position, dimension, and angle of thermal images of similar photographed objects in infrared thermal images photographed each time are different, causing subsequent analysis trouble. In this invention, via a reference image with a specified position and dimension presented in the infrared thermal image and reflecting specified morphological characters of the photographed object, a visual reference of predetermined thermal image quality and photographing requirements of the photographing object is provided, assisting the users to correctly grasp imaging states and photographing distances of the thermal image, (Continued)

thereby acquiring uniform normative thermal image of the photographed object.

52 Claims, 23 Drawing Sheets

(56) References Cited

U.S. PATENT DOCUMENTS

| | | | | |
|---|---|---|---|---|
| 2009/0302219 | A1* | 12/2009 | Johnson | G01C 3/08 250/332 |
| 2010/0182433 | A1* | 7/2010 | Shimbo | G06K 9/00771 348/153 |
| 2010/0225766 | A1* | 9/2010 | Haigh | G01J 5/02 348/164 |
| 2013/0155249 | A1* | 6/2013 | Neeley | H04N 5/33 348/159 |

* cited by examiner

| information of photographed objects | constituted data | position information |
|---|---|---|
| photographed object h6 | vector image data of contour image T6 | position information of contour image T6 in infrared thermal image |
| photographed object h7 | vector image data of contour image T7 | position information of contour image T7 in infrared thermal image |
| ... | ... | ... |

| information of photographed objects | type | constituted data | position information |
|---|---|---|---|
| photographed object h6 | contour | vector image data of contour image T6 | position information of contour image T6 in infrared thermal image |
| | texture | lattice data of texture image W6 | position information of texture image W6 in infrared thermal image |
| | analyzed area | constituted data of analyzed area F6 | position information of analyzed area F6 in infrared thermal image |
| | ... | ... | ... |
| photographed object h7 | contour | vector image data of contour image T7 | position information of contour image T7 in infrared thermal image |
| | texture | lattice data of texture image W7 | position information of texture image W7 in infrared thermal image |
| | analyzed area | constituted data of analyzed area F7 | position information of analyzed area F7 in infrared thermal image |
| | ... | ... | ... |

FIG. 5

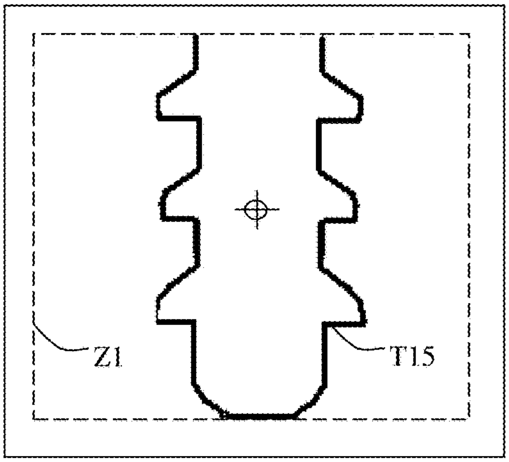
FIG. 15
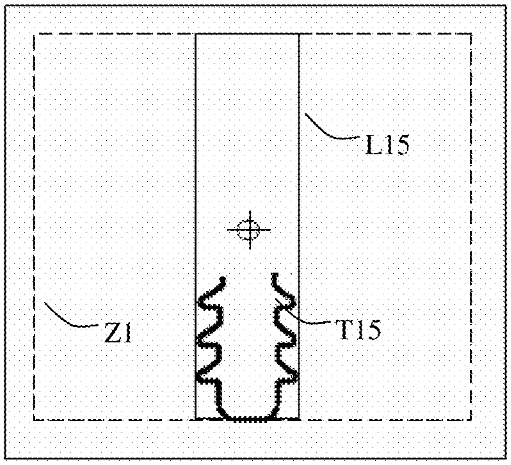
FIG. 16
| information of photographed objects | type | constituted data |
|---|---|---|
| photographed object h6 | contour | vector image data of contour image T6 |
| photographed object h7 | contour | vector image data of contour image T7 |
| … | … | … |
FIG. 17

| information of photographed objects | type | constituted data | position information |
|---|---|---|---|
| photographed object h6 | contour | vector image data of contour image T6 | |
| | texture | lattice data of texture image W6 | position information of texture image W6 relative to contour image T6 |
| | analyzed area | constituted data of analyzed area F6 | position information of analyzed area F6 relative to contour image T6 |
| | … | … | … |
| photographed object h7 | contour | vector image data of contour image T7 | |
| | texture | lattice data of texture image W7 | position information of texture image W7 relative to contour image T7 |
| | analyzed area | constituted data of analyzed area F7 | position information of analyzed area F7 relative to contour image T7 |
| | … | … | … |
| … | … | … | … |

FIG. 18 object processing

CD11 CD12 CD13

| constituted data | processing object | processing rule | | | |
|---|---|---|---|---|---|
| | | cutting | range extracting | edge extracting | … |
| contour | ● | ● | | | |
| texture | | | | | |
| … | | | | | |

FIG. 25 object computing

CD21 CD22 CD23

| constituted data | computing object | rule and parameter | | | | | |
|---|---|---|---|---|---|---|---|
| | | scaling | warping | center line | bounding rectangle | feature point | … |
| contour | ● | | | ● | | | |
| texture | | | | | | | |
| analyzed area | | | | | | | |
| contour (processing) | | | | | | | |
| … | | | | | | | |

FIG. 26

CD31 CD32 CD33 CD34 reference image

| constituted data | reference image | position rule | | | | synthesized parameter | | | |
|---|---|---|---|---|---|---|---|---|---|
| | | main object | self-adaption | assigned position | relevance | synthesized order | transparency ratio | color | relevance |
| contour | ● | ● | ● | | | 1 | 1 | | |
| texture | | | | | | | | | |
| analyzed area | ● | | | | | 2 | 1 | | |
| contour (computing) | | | | | | | | | |
| contour (processing) | | | | | | | | | |
| … | | | | | | | | | |

FIG. 28

CD41 CD42 CD43 CD44 switch ↕ CD40

| constituted data | reference image | position rule | | | | synthesized parameter | | | |
|---|---|---|---|---|---|---|---|---|---|
| | | main object | self-adaption | assigned position | relevance | synthesized order | transparency ratio | color | relevance |
| contour | ● | | | | | 1 | 1 | | |
| texture | | | | | | | | | |
| analyzed area | ● | ● | ● | | | 2 | 1 | | |
| contour (computing) | | | | | | | | | |
| contour (processing) | | | | | | | | | |
| infrared thermal image | | | | | | | | | |

FIG. 29 record setting

CD51 CD52

| constituted data | specified record information | | | | |
|---|---|---|---|---|---|
| | information of photographed object | constituted data | index information | position information | … |
| contour | | ● | | ● | |
| texture | ● | | | | |
| analyzed area | | ● | | ● | |
| contour (computing) | | | | | |
| contour (processing) | | | | | |

FIG. 30

THERMAL IMAGING DEVICE AND NORMATIVE PHOTOGRAPHING METHOD FOR THERMAL IMAGE

BACKGROUND OF THE INVENTION

Field of the Invention

This invention relates to a thermal imaging device and an infrared detection filed and, more particularly, to a thermal imaging device and a normative photographing method for a thermal image.

Description of the Related Art

As prior art, a thermal imaging device for imaging by receiving external infrared radiation energy is widely used. During photographing, each photographed object has specific requirements of a photographing part and a photographing angle, thereby presenting a specific imaging shape. Since infrared imaging detection technology is applied, users mainly depend on subjective experience to photograph, and fail to grasp a correct imaging shape of the photographed object and an imaging position, dimension, and angle of a thermal image of the photographed object in an infrared thermal image. Thus, key parts during photographing may be missed, and thermal images of the same or similar photographed objects which are photographed and record each time have differences in an imaging position, an imaging dimension, or an imaging angle.

The complexity of the record thermal images of the photographed objects causes that batch processing of a computer is difficulty and the subsequent analysis needs to be finished artificially (such as setting analyzed areas to which the thermal image of the photographed object corresponds, the analyzed area including several area units of points, lines, and planes, such as area units S01, S02, and S03 of an analyzed area F7 in FIG. 8, numbers, types, positions, and sizes of the area units being different, the final analyzed result may be different, the setting work being complicated). Further, since the record thermal image of the photographed object is not normative, discreteness of subsequent analyzed data is large, and availability of vertical and horizontal analysis and comparison of the data is lower. Obviously, the normative thermal image of the photographed object can adopt the batch processing of the computer and guarantee the effectiveness of the analyzed data. How to acquire a normative thermal image of a photographed object is a problem to be solved.

Technical persons in the field always try to solve the problem. Recently means for reducing technical difficulty of thermal image photographing and improving the photographing speed are known. For example, a patent with the application number of CN201010221335.8 discloses a thermal imaging device including a visible light imaging part and an infrared imaging part and displaying a photographed visible light image and an infrared thermal image together, which improves intuitive of infrared photographing. The prior grid lines and crosswise are used to assist aiming. However, for the users, the above improvement does not solve the problem.

Therefore, a thermal imaging device, without depending excessively on experience accumulation and complicated operation, capable of assisting the users to accurately grasp the imaging shape of the photographed object and the imaging position, dimension, and angle of the thermal image of the photographed object in the infrared thermal image, improving photographing quality, and facilitating recording normative thermal image of the photographed object, is needed. Therefore, the common users can achieve the better photographing level.

BRIEF SUMMARY OF THE INVENTION

This invention provides a thermal imaging device and a normative photographing method for a thermal image. According to a specified position in an infrared thermal image, a reference image with a specified dimension, reflecting specified morphological characters of a photographed object, and the infrared thermal image are displayed together. The reference image is used as a visual reference of a thermal image of a photographed object during photographing, which provides a visual prompt for an imaging shape of the photographed object, thereby avoiding omission and faulty photographing part, and prompting a normative imaging position, dimension, and angle of a thermal image of a photographed object in the infrared thermal image. As the reference image is used as a photographing reference, technical requirements for the users are reduced, and it is convenient for recording the acquired normative thermal image of the photographed object.

This invention provides a thermal imaging device including an acquiring part, a reference image determining part, a position determining part, a display controlling part, and a recording part. The acquiring part is used for continuously acquiring thermal imaging data. The reference image determining part is used for determining constituted data related to a reference image reflecting specified morphological characters of a photographed object, and the determined constituted data is used for acquiring the reference image reflecting the specified morphological characters of the photographed object. The position determining part is used for determining a specified position and a specified dimension of the reference image located in an infrared thermal image. The display controlling part is used for together displaying the reference image with the specified dimension acquired by the determined constituted data and the infrared thermal image generated by the continuously acquired thermal imaging data according to the specified position. The recording part is used for recording infrared data, and the infrared data is the acquired thermal imaging data and/or data acquired after specified processing for the acquired thermal imaging data.

This invention further provides a thermal imaging device including an acquiring part, a reference image determining part, a position determining part, a synthesizing part, and a recording part. The acquiring part is used for continuously acquiring thermal imaging data. The reference image determining part is used for determining constituted data related to a reference image reflecting specified morphological characters of a photographed object, and the determined constituted data is used for acquiring the reference image reflecting the specified morphological characters of the photographed object. The position determining part is used for determining a specified position and a specified dimension of the reference image located in an infrared thermal image. The synthesizing part is used for continuously synthesizing the infrared thermal image and the reference image according to the specified position, to acquire a synthesized image. The infrared thermal image is generated according to the thermal imaging data continuously acquired by the acquiring part, and the reference image is acquired according to the specified dimension and the constituted data determined by the reference image determining part. The recording part is used for recording infrared data, and the infrared data is the acquired thermal imaging data and/or data acquired after specified processing for the acquired thermal imaging data.

This invention further provides a thermal imaging device including an acquiring part, a reference image determining part, a position determining part, a synthesizing part, and a recording part. The acquiring part is used for continuously acquiring thermal imaging data. The reference image determining part is used for determining constituted data related to a reference image reflecting specified morphological characters of a photographed object, and the determined constituted data is used for acquiring the reference image reflecting the specified morphological characters of the photographed object. The position determining part is used for determining a specified position and a specified dimension of the reference image located in an infrared thermal image. The synthesizing part is used for performing selective pseudo-color processing for the continuously acquired thermal imaging data according to the specified position and the reference image with the specified dimension acquired by the determined constituted data, to acquire a synthesized image reflecting the reference image and the infrared thermal image generated by the thermal imaging data. The recording part is used for recording the infrared data, and the infrared data is the acquired thermal imaging data and/or data acquired after specified processing for the acquired thermal imaging data.

This invention further provides a thermal imaging device including an acquiring part, a reference image determining part, a position determining part, a display controlling part, and a recording part. The acquiring part is used for acquiring thermal imaging data. The reference image determining part is used for determining constituted data related to a reference image reflecting specified morphological characters of a photographed object, and the determined constituted data is used for acquiring the reference image reflecting the specified morphological characters of the photographed object. The position determining part is used for determining a specified position and a specified dimension of the reference image located in an infrared thermal image. The display controlling part is used for together displaying the reference image with the specified dimension acquired by the determined constituted data and the infrared thermal image generated by the thermal imaging data according to the specified position. The recording part is used for recording infrared data, and the infrared data is the acquired thermal imaging data and/or data acquired after specified processing for the acquired thermal imaging data.

This invention provides a normative photographing method for a thermal image. The method includes the following steps. An acquiring step is used for continuously acquiring thermal imaging data. A reference image determining step is used for determining constituted data related to a reference image reflecting specified morphological characters of a photographed object, and the determined constituted data is used for acquiring the reference image reflecting the specified morphological characters of the photographed object. A position determining step is used for determining a specified position and a specified dimension of the reference image located in an infrared thermal image. A synthesizing step is used for continuously synthesizing the infrared thermal image and the reference image according to the specified position to acquire a synthesized image. The infrared thermal image is generated by the thermal imaging data continuously acquired by the acquiring step, and the reference image is acquired according to the specified dimension and the constituted data determined in the reference image determining step. A recording step is used for recording infrared data, and the infrared data is the acquired thermal imaging data and/or data acquired after specified processing for the acquired thermal imaging data.

These and other features, aspects, and advantages of the present invention will become better understood with regard to the following description, appended claims, and accompanying drawings.

BRIEF DESCRIPTION OF THE DRAWINGS

FIG. 5 is a schematic diagram showing information of the photographed object and a plurality of types of the constituted data stored in the storage part according to one embodiment;

FIG. 15 is a schematic diagram showing a self-adaptive display effect after performing a "centering reference image" process for a local contour image;

FIG. 16 is a schematic diagram showing a self-adaptive display effect after performing a "centering reference range" process for the local contour image;

FIG. 17 is a schematic diagram showing information of the photographed object and morphological constituted data stored in the storage part in another way;

FIG. 18 is a schematic diagram showing information of the photographed object and a plurality of types of the constituted data stored in the storage part in another way;

FIG. 25 is a schematic diagram showing a menu setting interface of object processing in a fifth embodiment;

FIG. 26 is a schematic diagram showing a menu setting interface of object computing in the fifth embodiment;

FIG. 28 is a schematic diagram showing a menu setting interface of the reference image in the fifth embodiment;

FIG. 29 is a schematic diagram showing a menu setting interface of switch in the fifth embodiment;

FIG. 30 is a schematic diagram showing a menu setting interface of specified record information in the fifth embodiment;

DETAILED DESCRIPTION OF THE INVENTION

This invention may be further described according to the drawings and embodiments. For better understanding, the following described embodiments do not limit the scope of the invention and can be changed to different forms in the scope of the invention. In the invention, thermal imaging data may be thermal image AD data (such as the data acquired after AD conversion of output signals of an infrared detector), image data of an infrared thermal image, array data of temperature values, or other data generated based on the thermal image AD data. From the first embodiment to the fifth embodiment, the thermal imaging data is taken the thermal image AD data as an example, and a photographing part is as an example of an acquiring part. In the sixth embodiment, the thermal imaging data is taken compressed thermal image AD data or image data of compressed infrared thermal images as an example, and a communication interface is as an example of an acquiring part.

Figure 1:
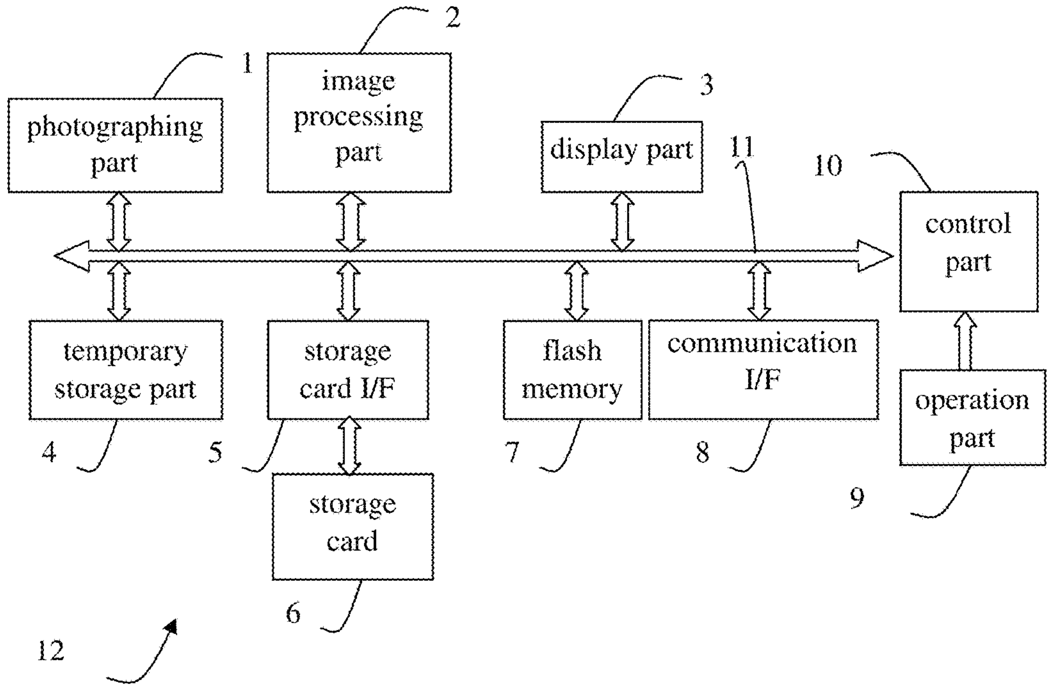
FIG. 1 is a block diagram showing a thermal imaging device.
Figure 2:
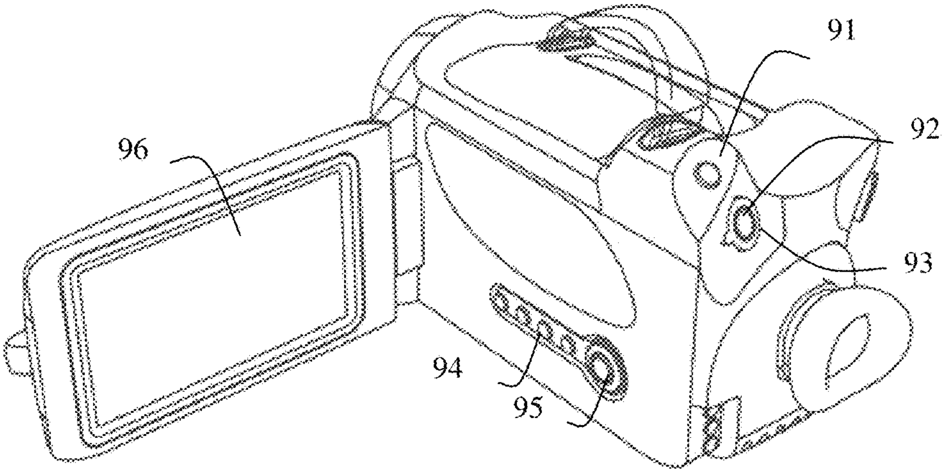
FIG. 2 is an outline diagram showing the thermal imaging device in the embodiments.

The first embodiment is described in detail according to FIG. 1. FIG. 1 is a block diagram showing a thermal imaging device 12 in the first embodiment. FIG. 2 is an outline diagram showing the thermal imaging device 12 in the first embodiment.

The thermal imaging device 12 includes a photographing part 1, an image processing part 2, a display part 3, a temporary storage part 4, a storage card I/F 5, a storage card 6, a flash memory 7, a communication I/F 8, an operation part 9, and a control part 10. The control part 10 is connected with each other part via a control and data bus 11, and is responsible for overall control of the thermal imaging device 12. The control part 10 may be realized by CPU, MPU, SOC, or programmable FPGA.

The photographing part 1 includes an optical part, a driving part, an infrared detector, and a signal preprocessing circuit, which are not shown. The optical part is composed of infrared optical lenses, and is used for focusing received infrared radiation on the infrared detector. The driving part drives the lenses to perform focusing or zooming operation according to a control signal of the control part 10, and the optical part may also be manually regulated. The infrared detector, such as a refrigerating or non-refrigerated infrared focal plane detector, converts the infrared radiation passing through the optical part to electrical signals. The signal preprocessing circuit includes a sample circuit, an AD conversion circuit, and a timing trigger circuit, and performs signal processing such as sampling for the signals read from the infrared detector in a specified period. The signals are converted to digital thermal imaging data by the AD conversion circuit. The thermal imaging data may be 14-bit or 16-bit binary data (also called AD value). The thermal imaging data is temporarily stored in the temporary storage part 4. In the embodiment, the photographing part 1 is as an example of an acquiring part, and is used for photographing a photographed object to acquire the thermal imaging data (frame).

The image processing part 2 is used for performing specified processing for the thermal imaging data acquired by the photographing part 1. The image processing part 2 performs processing for converting data to be suitable for displaying or recording, such as modification, interpolation, pseudo-color, synthesis, compression, or decompression. For example, based on a record instruction of the control part 10, the image processing part 2 is used for performing specified compression for the thermal imaging data to acquire compressed thermal imaging data, and then the thermal imaging data is record to a storage medium such as the storage card 6. In addition, based on the control of the control part 10, the image processing part 2 performs different processing related to image processing, such as increasing and decreasing pixels to change the dimension of the image data, or cutting of the image data. The image processing part 2 may be realized by DSP, other microprocessors, or programmable FPGA, or the image processing part 2 may also be integrally formed with the control part 10.

In the embodiment, the image processing part 2 is as an example of a synthesizing part, and is used for continuously synthesizing the infrared thermal image, generated by the thermal imaging data photographed by the photographing part according to the specified position, and the reference image, acquired from the constituted data determined by the reference image determining part according to the specified dimension, to acquire a synthesized image. The synthesized processing allows the displayed synthesized image (displayed by the display part 3) to present the thermal image of the photographed object and the reference image with the specified position and specified dimension and reflecting the specified morphological characters of the photographed object together.

The image processing part 2 is used for performing specified processing, such as pseudo-color processing, for the thermal imaging data acquired by the photographing part 1 to acquire the infrared thermal image, or the image processing part 2 performs the specified processing, such as non-uniformity correction or interpolation, for the thermal imaging data acquired by the photographing part 1 and performs the pseudo-color processing for the thermal imaging data after the specified processing. As to the pseudo-color processing in detail, a corresponding range of a pseudo-color plate may be determined according to a range of AD values of the thermal imaging data or a setting range of the AD values, and the particular color value to which each AD value of the thermal imaging data corresponds in the range of the pseudo-color plate is used as the image data of the corresponding pixel position in the infrared thermal image. In the embodiment, gray scaling for the infrared image may be as a special example of the pseudo-color processing.

According to one embodiment of the synthesized processing, in detail, according to the specified position, the infrared thermal image and the reference image with the specified dimension may be continuously synthesized in a specified transparency ratio, to allow the acquired synthesized image to present the thermal image of the photographed object and the reference image with the specified position and the specified dimension and reflecting the specified morphological characters of the photographed object together.

The transparency ratio represents the ratio of image data of the reference image and the background (infrared thermal image) image during synthesis in the corresponding pixel of the synthesized image. In the synthesized pixels, the sum of the transparency ratio of the reference image and the infrared thermal image is usually one (when pluralities of images overlap, there are specified transparency ratios, respectively, and the sum is usually one). Aiming at all overlapped pixel points of the reference image and the infrared thermal image, the image data of the synthesized overlapped pixel points may be acquired according to the formula "the synthesized pixel=the image data of the reference image×the transparency ratio of the reference image+the image data of the infrared thermal image×(1−the transparency ratio of the reference image)". For example, when the transparency ratio of the reference image is one, and the transparency ratio of the infrared thermal image is zero, the image data of the pixels of the reference image in a corresponding position replaces the image data of the pixels of the infrared thermal image in the corresponding position, which represents that the image of the infrared thermal image in the corresponding position is totally shaded. When the transparency ratios are equal, the image data added by the image data of the two images with the equal ratio is used as the image data of the pixel of the synthesized image. In the synthesized image, the reference image is semitransparent, and the infrared thermal image can by displayed through the reference image, or the reference image can be displayed through the infrared thermal image. The specified transparency ratio may be a default value stored in the thermal imaging device 12, may be set by a user through the operation part 9, or may be stored in the attribute of the constituted data related with the reference image.

When there are a plurality of synthesized objects (the reference image includes a plurality of synthesized objects) for synthesizing with the background (such as, the infrared thermal image), according to the synthesized order of each synthesized object and the corresponding transparency ratio, the synthesized processing may be gradually performed to acquire the final displayed image. For example, when there are a synthesized object 1 (the synthesized order is 1) and the synthesized object 2 (the synthesized order is 2), according to the transparency ratio of the synthesized object 1, the synthesized object 1 is first synthesized with the background (the infrared thermal image) to acquire intermediate data "the image data of the synthesized object 1×the transparency ratio of the synthesized object 1+the image data of the background×(1−the transparency ratio of the synthesized object 1)", and then the synthesized object 2 is further synthesized with the intermediate data according to the transparency ratio of the synthesized object 2, that is, the acquired synthesized pixel is obtained according to the formula, the synthesized object 2×the transparency ratio of the synthesized object 2+the intermediate data×(1−the transparency ratio of the synthesized object 2).

In addition, according to the specified threshold range and the corresponding specified transparency ratio, the corresponding transparency ratio of the image data of the reference image or the infrared thermal image located in the threshold range can be determined. The specified threshold range and the specified transparency ratio may be prestored, or may be set and adjusted by users. The threshold range may be an AD value range, a temperature band (value) range, a gray scale range, or a color range. For example, when the constituted data of the reference image is the thermal imaging data, the corresponding transparency ratio of the threshold range (such as the AD value range or the temperature band range) of the thermal imaging data is used to determine which part of the thermal imaging data of the reference image to generate the image data for displaying in the synthesized image during synthesis (for example, the specified transparency ratio of the image data generated by the thermal imaging data in the threshold range is one, and others are zero). Otherwise, the threshold range (such as the AD range or the temperature band range) of the photographed thermal imaging data may also be used to determine which part of the thermal imaging data of the infrared thermal image to generate the image data for displaying in the synthesized image (for example, the specified transparency ratio of the image data generated by the thermal imaging data in the threshold range is one, and others are zero), to prevent the important part (in the threshold range) of the infrared thermal image from shading. In the embodiment, the transparency ratio of the reference image may also be a changeable value.

According to another embodiment of the synthesized processing of the infrared thermal image and the reference image, the image processing part 2 as the synthesizing part performs selective pseudo-color processing for the thermal imaging data acquired by photographing, according to a corresponding pixel position of the reference image with the specified position and specified dimension in the infrared thermal image, to acquire the synthesized image. In detail, taking the image data of the reference image in the corresponding pixel position as the image data of the synthesized image in the pixel position for example, the pseudo-color processing is not performed for the thermal imaging data in the corresponding pixel position, and the pseudo-color processing is performed for the thermal imaging data except the pixel position of the reference image to acquire the image data of the infrared thermal image, thus to generate the synthesized image. For example, the pseudo-color processing for the thermal imaging data of the pixel position of the thermal imaging data corresponding to the reference image may be different from that for the thermal imaging data of other pixel positions, such as pseudo-color processing of different pseudo-color plates. or the pseudo-color processing is performed after a specified value is taken away from the thermal imaging data of the pixel position in the thermal imaging data corresponding to the reference image, thus to generate the synthesized image. The processing speed can be accelerated, and the reference image with a line pattern is suitable. To the reference image which needs to synthesize in this way, corresponding type information or marks can be attached in the attribute of the constituted data.

A display controlling part (the control part 10) preferably allows the display part to display the synthesized image acquired from the above processing mode or several processing modes, thus to together display the reference image with the specified dimension acquired by the determined constituted data and the infrared thermal image generated by the continuously acquired thermal imaging data according to the specified position. However, the invention is not limited thereto. For example, based on a specified display device, the reference image may also be projected on the infrared thermal image for displaying together. At this moment, the functions of the synthesized processing of the image processing part 2 can be removed.

The display part 3 includes a display driving circuit and a liquid crystal display. Under the control of the control part 10, the display driving circuit drives the liquid crystal display to continuously display the photographed infrared thermal image in a photographing stand-by mode, to continuously display the synthesized image in a reference processing mode, and to display the infrared thermal image read and expanded from the storage card 6 in a reproduction mode. In addition, different setting information can be displayed according to the control of the control part 10. In the embodiment, the display part 3 is as an example of the display part. However, the invention is not limited. The display part 3 may also be other display devices connected with the thermal imaging device 12, and the thermal imaging device 12 may not include display devices in itself.

The temporary storage part 4, such as a RAM or DRAM volatile storage, is a buffer storage for temporarily storing the thermal imaging data output from the photographing part 1, and is a working storage of the image processing part 2 and the control part 10 for temporarily storing the processed data of the image processing part 2 and the control part 10. However, the invention is not limited. The storage or register in the processor such as the control part 10 or the image processing part 2 may also be defined as a temporary storage medium.

The storage card I/F 5 is used as an interface of the storage card 6. The storage card I/F 5 is connected with the storage card 6 as a rewritable nonvolatile storage, which can be detachably installed in a groove of the main body of the thermal imaging device 12 and can record the data such as the thermal imaging data according to the control of the control part 10.

The flash memory 7 (build-in a flash memory) in the embodiment is as an example of the storage part, and is used for storing the constituted data at least related to the reference image reflecting the specified morphological characters of the photographed object. The stored constituted data at least includes morphological constituted data. That is, the stored constituted data is the morphological constituted data, or the stored constituted data includes the morphological constituted data and other constituted data (called auxiliary constituted data in the following text).

In the embodiment, the storage part may be a storage medium of the thermal imaging device 12, for example a nonvolatile storage medium such as the flash memory 7 or the storage card 6, or a volatile storage medium such as the temporary storage part 4, or may be other storage mediums wiredly or wirelessly connected with the thermal imaging device 12, for example other devices wiredly or wirelessly connected with the communication I/F 8, such as the storage medium of other storage devices, the thermal imaging device, or computers, or the storage medium of the network destination. Preferably, the data such as the constituted data is prestored in the thermal imaging device 12 or in the nonvolatile storage medium connected with the thermal imaging device 12.

Figures 3, 4:
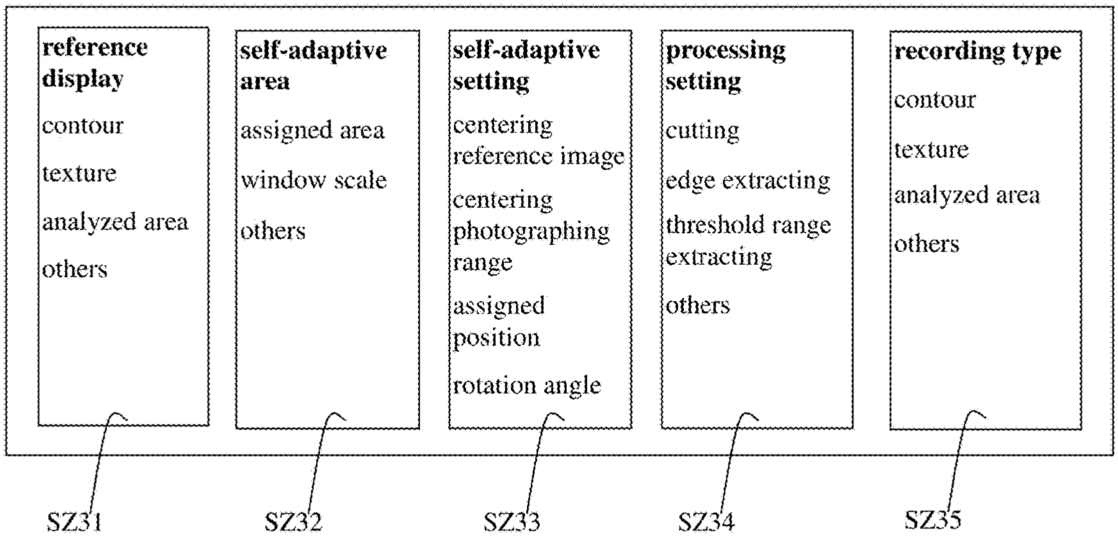
FIG. 3 is a schematic diagram showing a menu setting interface of the thermal imaging device.
FIG. 4 is a schematic diagram showing information of a photographed object and morphological constituted data stored in a storage part according to one embodiment.

In FIG. 4, one embodiment of the constituted data stored in the storage part is described, that is, information of a plurality of photographed objects and the morphological constituted data related to the information of each photographed object is stored. The information of the photographed objects, the morphological constituted data related to the information of the photographed objects, the position information (such as a position, a dimension, or a rotating angle) of the image generated by the morphological constituted data located in the infrared thermal image is included. For example, when the stored morphological constituted data is composed of coordinates of a plurality of points, the dimension of the reference image is also stored, and the stored coordinates of the points determine the dimension of the reference image formed by the points. In a similar way, when the position determining part determines the position of the points composing the reference image in the infrared thermal image, the specified dimension of the reference image is also determined. The information of the photographed object may be a type, a name, a number, a place, which represents the identity of the photographed object, or a combination thereof. In addition, the detailed expression form of the position information may also be position parameters (located in the display window of the infrared thermal image) in a coordinate system of the whole picture (for example, when the picture includes the display window of the infrared thermal image and the display window of other information located outside of the display window of the infrared thermal image) in the display part.

The morphological constituted data is the constituted data representing the image of the specified morphological characters of the photographed object, and is the image and/or constituted data of the image reflecting the specified morphological characters of the photographed object, such as lattice data, vector image data, or the data composed of the lattice data and the vector image data. In the embodiment, the lattice data may be lattice image data, such as the lattice data composed by array data like the thermal imaging data. The morphological constituted data may be acquired from different kinds of images of the photographed object, such as the infrared thermal image or visible thermal image, acquired according to a specified photographing angle or photographing position, or may be prestored in the storage part (such as the flash memory 7). The reference image can correspond to the specified morphological characters of the whole or part (such as T15 in FIG. 16) of the photographed object.

Figure 6:
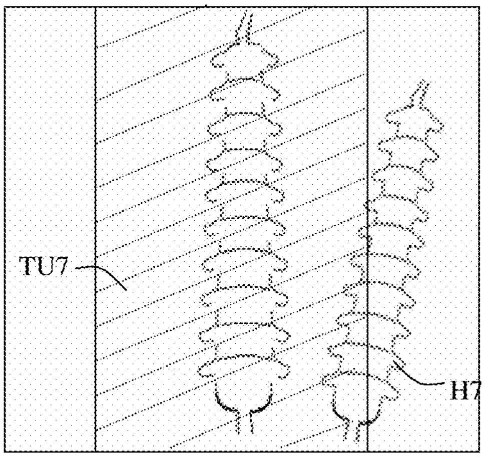
FIG. 6 is a schematic diagram showing a synthesized image with a reference image formed by a visible light image.

The reference image reflecting the specified morphological characters of the photographed object may reflect the specified morphological characters of the thermal image of the photographed object, such as the infrared thermal image including the thermal image of the photographed object. However, the invention is not limited. Since other types of images such as the visible light image and ultraviolet image of the photographed object have similarity of contour and texture or reference in cooperative use with the infrared thermal image, the reference image further may be different types of the images of the photographed object, such as the visible light image or images of the photographed object drew in advance, reflecting the specified morphological characters. After synthesis, the image is semitransparent in the synthesized image according to the specified transparency ratio, which provides a visual reference using morphology of the photographed object representing the specified photographing angle and the photographing position as the photographing reference. In FIG. 6, the reference image TU7 as the visible light image is semitransparent, semitransparently shading the part of the thermal image H7 of the photographed object located in the semitransparent reference image TU7. Although the observation effect may be affected, the reference image is livelier and is convenient for understanding.

Figure 7:
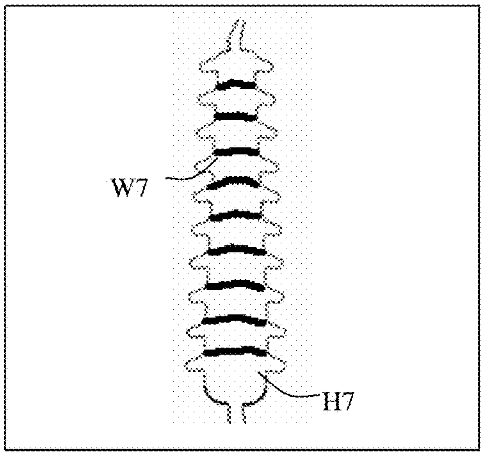
FIG. 7 is a schematic diagram showing a synthesized image with a reference image formed by a texture image.

The reference image reflecting the specified morphological characters of the photographed object may be the image only reflecting the contour and/or texture character of the photographed object. The pixel position of the reference image in the synthesized image indicates the contour and/or texture character related to the morphology of the photographed object, and other positions of the synthesized image can show the infrared thermal image without shading and reducing shade of the thermal image of the photographed object. For example, the contour image T7 in FIG. 8 may only shade the infrared thermal image at the pixel position of the contour image T7, without shading the infrared thermal image at other positions. The morphological constituted data may be vector image data (such as the contour image T7 in FIG. 8) or lattice data (such as the texture image W7 in FIG. 7), and other pixel positions except the contour and/or texture character positions in the reference image can transparently show the infrared thermal image. The reference image can be opaque or semitransparent.

Figure 8:
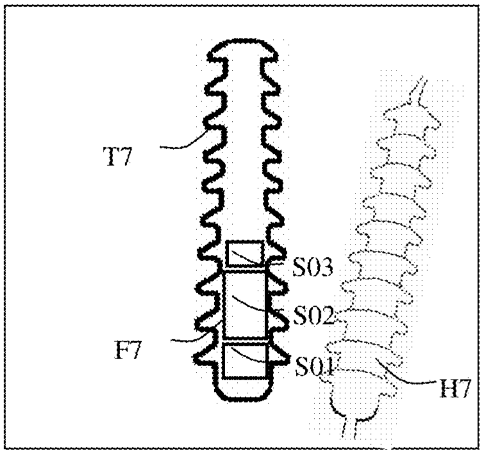
FIG. 8 is a schematic diagram showing a synthesized image with a referenced image formed by a contour image and an analyzed area.
Figure 9:
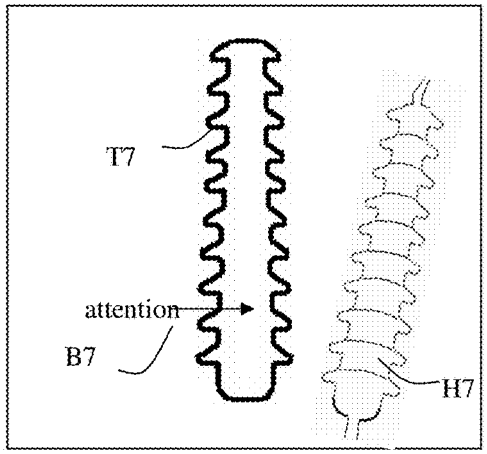
FIG. 9 is a schematic diagram showing a synthesized image with a reference image formed by a contour image and an instruction mark.

The reference image reflecting the specified morphological characters of the photographed object may also include other prompting images as an auxiliary, such as an analyzed area F7 (the analyzed area F7 is composed of three frame analyzed area units numbered as S01, S02, and S03) representing a key observation area in FIG. 8 or a prompting mark B7 representing photographing in FIG. 9, for prompting users to observe corresponding key interested parts of the reference image. For example, although the morphological constituted data can acquire the reference image including the analyzed area F7 and the contour image T7 in FIG. 8, in one preferable embodiment, the morphological constituted data (acquiring the contour image T7) and auxiliary constituted data (such as acquiring the constituted data of the analyzed area) can be used for acquiring the reference image (including the analyzed area F7 and the contour image T7) in FIG. 8 together, thereby promoting the reference effect of the contour image T7 and avoiding disadvantages of the weak reference of the single auxiliary image F7. In the embodiment, the auxiliary constituted data may be vector image data, lattice data, or including the vector image data and the lattice data together, such as for acquiring the analyzed area in FIG. 8 or the prompting mark in FIG. 9. The analyzed area may be a point, a line, or a plane, and in actual, the analyzed area may include one or more analyzed area units (points, lines, planes) and number information of the analyzed area units. The constituted data of the analyzed area for acquiring the analyzed area may include the vector image data of the area units and the number information of the area units. The constituted data related to the reference image may be different types of morphological constituted data and auxiliary constituted data, and the constituted data for acquiring the reference image may be one or more, including at least the morphological constituted data.

In addition, the specified auxiliary constituted data may also be used for specifying the position parameter of the reference image in the infrared thermal image, such as setting the auxiliary object acquired by the auxiliary constituted data as a reference range area, representing the area represented by the auxiliary object as key observation. In addition, the specified auxiliary constituted data, such as the data of the point, line, and plane with specified relative position relation of the reference image, is relatively stored with thermal imaging data during recording and processing. Since the data size of the morphological constituted data is larger, recording the auxiliary constituted data of the auxiliary object with specified relative position relation of the reference image can reduce the stored data size. When the object acquired by the auxiliary constituted data represents the analyzed area, the recording mode is benefit for subsequent batch processing.

A storage part in FIG. 5 according to another storage embodiment, stores information of a plurality of photographed objects and the constituted data related to a plurality of types of the reference image with type information related to the information of each photographed object, including a plurality types of the morphological constituted data and the constituted data of the analyzed area and the position information (such as a position, a dimension, or a rotating angle) of the image generated by the constituted data in the infrared thermal image. When the auxiliary constituted data is a single point (for example the analyzed area is a single point), the position is only stored. The constituted data can be used for composing the image of different reference types, and is convenient for switching in use, thus to balance between the better reference effect and the shading for the infrared thermal image.

The type information indicates types of different constituted data, and the type can be classified according to reference characters, photographing measurement purposes, or data formats of the constituted data. In one classifying embodiment, the reference character is used for classifying. A user can set the specified determined type of the constituted data for generating the reference image in a menu setting bar SZ31 in FIG. 3 and can set the constituted data related with the reference image as one or more types of the morphological constituted data such as the contour, the texture, or others (such as visible light or infrared thermal image), in addition, further including the constituted data of the analyzed area. When multiple options are set, the reference type of the reference image generated by the multiple constituted data is represented. For example, when the contour and texture is selected, the reference image includes the contour image and the texture image, and when the contour and the analyzed area are selected, the reference image includes the contour image and the analyzed area. The set determined type can be stored as a default value of the specified determined type. Obviously, classifying is not limited to the single constituted data, and can be for combination of multiple constituted data.

In FIG. 4, one storage embodiment of the morphological constituted data related to information of one photographed object is shown. In FIG. 5, one storage embodiment of a plurality of types of the constituted data related to information of one photographed object is shown. Information of parts of different photographed objects (such as the photographed objects with the same model) related to the same constituted data such as the morphological constituted data is also presented. In the storage embodiment shown in FIG.

5, the type information may not be attached, which can be selected by users. The storage contents in FIG. 4 and FIG. 5 can be stored in several documents, such as a data document of the morphological constituted data with a document name of the information of the photographed object, or further using files to classify the documents. The storage contents in FIG. 4 or FIG. 5 may be stored in a data base or a data document with a specified form. The constituted data related to the information of the photographed object may be the constituted data directly related to the information of the photographed object, may be certain constituted data directly related to the information of the photographed object and also related to other constituted data which is related to the information of the photographed object, or may be the constituted data to which the index information of the constituted data related to the information of the photographed object corresponds and related to the information of the photographed object. In addition, if the related mode is by the index information (such as a document name) of the morphological constituted data stored in tables in FIG. 4 or FIG. 5, the morphological constituted data corresponding to the index information (such as the document name) is further stored in the storage medium. In an infrared detection scene, there are a large number of different photographed objects with the same shape, the morphological constituted data is stored in the related mode of the information of the photographed object and the morphological constituted data, which is convenient for users to select information of the photographed object according to the acknowledge on site of the photographed object, further to avoid mistakes of the selection of the constituted data and to reduce data redundancy.

The communication I/F 8 may be an interface for connecting the thermal imaging device 12 and an external device and for exchanging data according to communication specification such as USB, 1394, or network. The external device may be a personal computer, a server, a PDA (personal digital assistant device), other thermal imaging devices, a visible light photographing device, or a storage device.

The operation part 9 is used for a user to emit an instruction to the thermal imaging device 12 or to input setting information. The operating part 9 may include a record key 91, an enter key 92, a focusing key 93, a mode setting key 94, and a cross key 95 as shown in FIG. 2. However, the invention is not limited thereto. A touch screen 96 or a phonic part may be used for realizing related operation.

The control part 10 (such as a CPU) controls the whole action of the thermal imaging device 12. The storage medium such as the flash memory 7 stores control programs and data for using in control of each part. The structure of the thermal imaging device 12 in the embodiment is not limited, and the technique people in the field can modify the structure to realize the invention.

The control part 10 performs control of multiple modes via the control programs. After the power is on, the interior circuit of the control part 10 is initialized. Then, a standby photographing mode is entered, that is, the photographing part 1 acquires the thermal imaging data, and the image processing part 2 performs specified processing for the thermal imaging data acquired by the photographing part 1, to store in the temporary storage part 4 and to allow the display part 3 to continuously display the infrared thermal image in a dynamic image mode. In the state, the control part 10 performs control and continuously monitors whether other modes are switched according to the predetermined condition or shutdown operation is performed. According to the result, corresponding processing control is performed.

Figure 10:
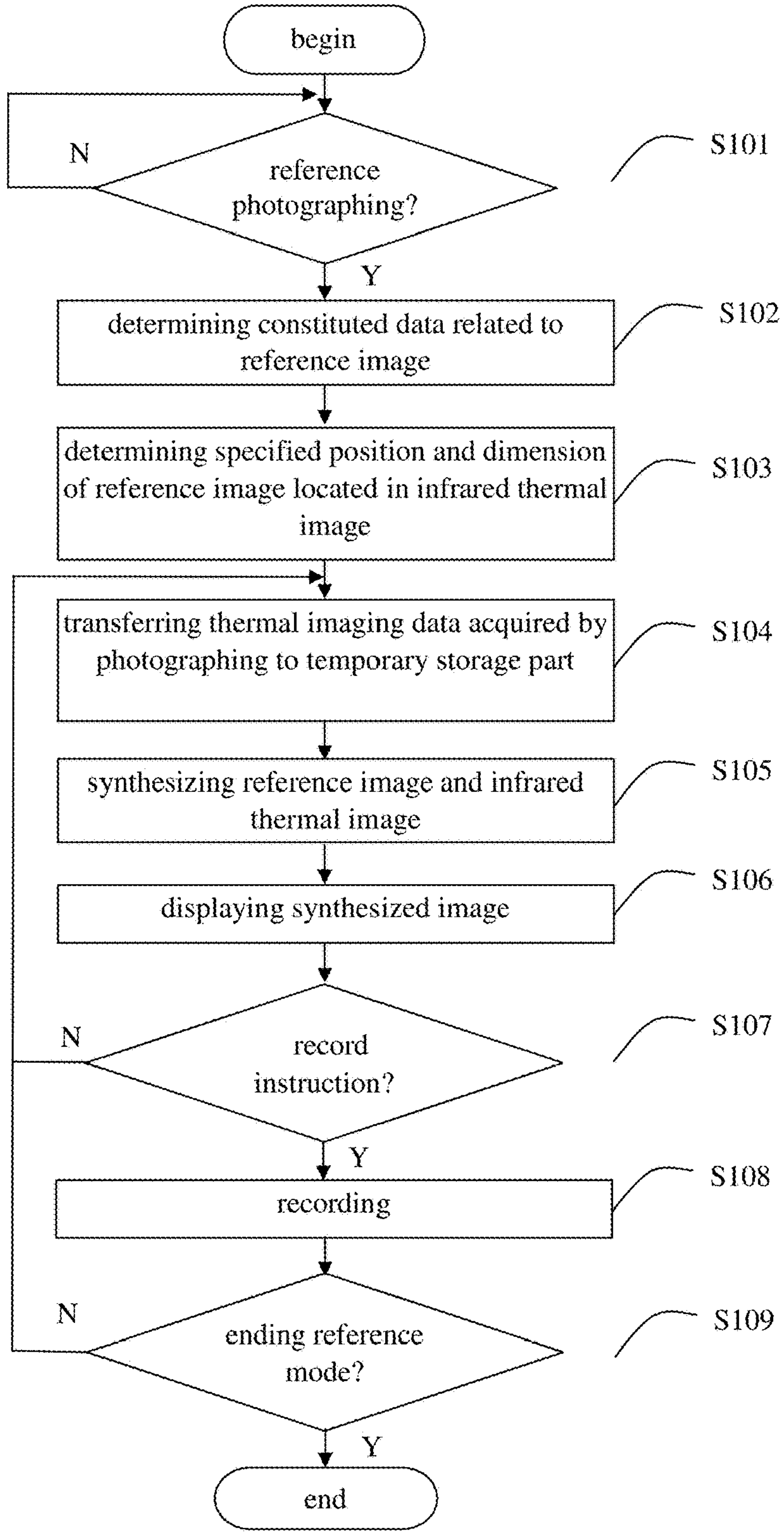
FIG. 10 is a flow chart showing a reference record mode.
Figure 11:
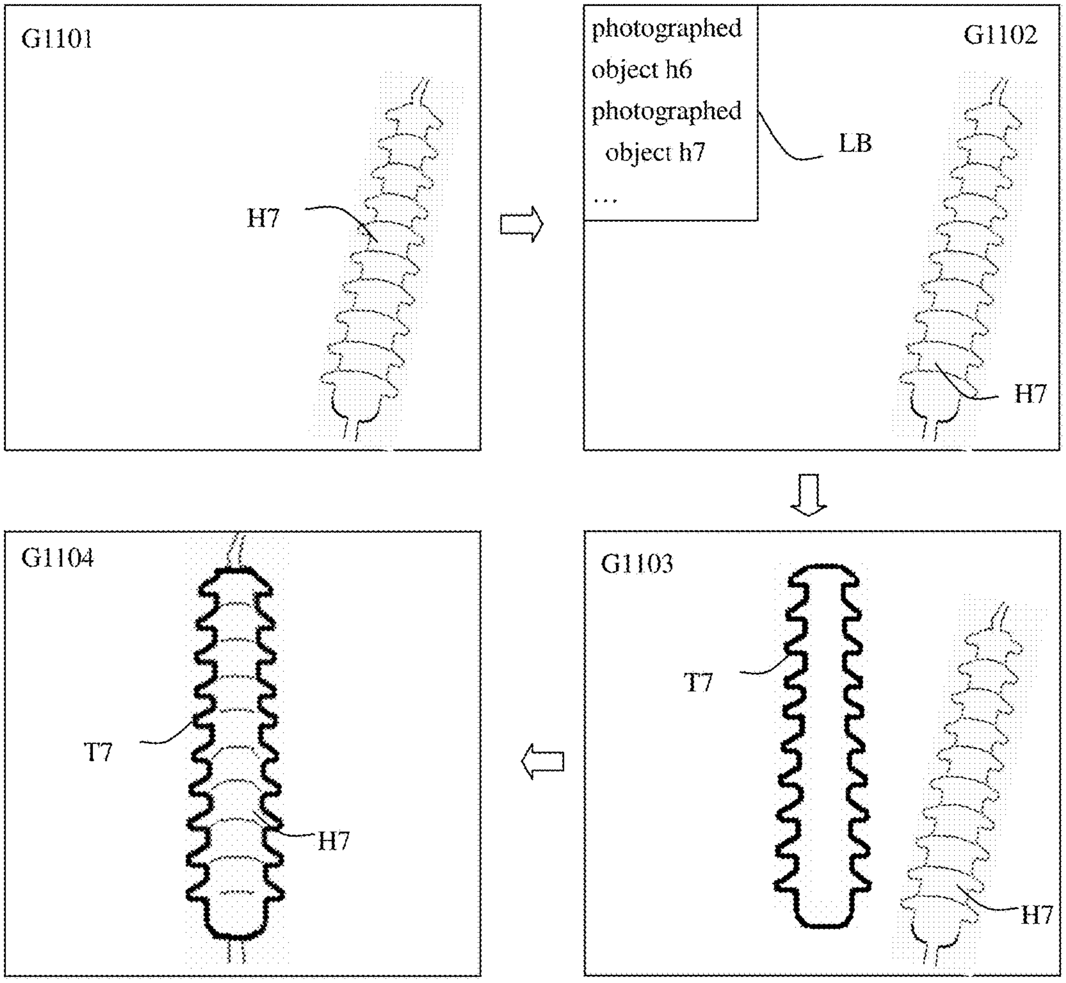
FIG. 11 is a schematic diagram showing a display interface of photographing a photographed object h7 by the reference image.

A normative photographing method (a reference record mode) is described hereinbelow. In the embodiment, the control part 10 is as an example of a reference image determining part, a position determining part, a display controlling part, and a recording part. FIG. 10 is a flow chart showing a reference record mode. FIG. 11 is a schematic diagram showing a display interface of reference record photographing of the photographed object. In the embodiment, a scene of infrared detection of power equipment is taken for example, and the photographed object h7 is photographed and record. The steps are described as follows.

In step S101, the control part 10 continuously monitors if users select the reference record mode.

In the standby photographing state, the display part 3 displays the dynamic infrared thermal image. At that moment, the infrared thermal image as shown in a display interface G1101 in FIG. 11 is acquired by the photographing angle and distance. In the past, the user may be confused by the specified morphological characters of the thermal image H7 of the photographed object and the imaging distance, dimension, and angle in the infrared thermal image. To guarantee the photographing quality, the user can select the reference record mode to enter into step S102 through the predetermined operation of the operation part 9 such as a mode key.

In step S102, the constituted data related to the reference image synthesized with the infrared thermal image is determined. The control part 10 is as the reference image determining part, and is used for determining the constituted data related to the reference image, synthesized with the infrared thermal image and reflecting the specified morphological characters of the photographed object, according to the constituted data stored in the storage part. The determined constituted data at least includes the morphological constituted data. That is, the determined constituted data is the morphological constituted data, or the determined constituted data includes the morphological constituted data and the auxiliary constituted data.

In the embodiment, the flash memory 7 stores the storage content shown in FIG. 4 or FIG. 5, for responding to the operation of the user in the step S101. According to the information of the photographed object stored in the flash memory 7, the control part 10 allows a specified number of options of the photographed object generated according to the information of the photographed object to display on the display part 3, such as an option list LB of the information of the photographed object shown as G1102 in FIG. 11. The user finds and selects the "photographed object h7" in the LB via the cross key of the operation part 9 according to acknowledge of the photographed object h7, such as an equipment destination board on site, and presses the enter key. In the embodiment, the control part 10, the operation part 9, and the display part 3 are as an example of a selecting part for selecting the information of the photographed object. According to the operation of the user, the information of the photographed object "photographed object h7" is selected. The information of the photographed object includes a type, a name, a number, a place, which represents the identity of the photographed object, or a combination thereof. Therefore, when the option of the information of the photographed object is a combination of several options, the information of the final photographed object may be determined by selecting from the several options. The expression form of the option of the information of the photographed object may be numbers, words, icons, or graphs. The selecting part is not limited to display the options of the information of the photographed object, and may also select the information of the photographed object by inputting the number of the information of the photographed object.

The flash memory 7 may store the storage content as shown in FIG. 4 for responding the operation. The control part 10 determines the vector image data of the contour image T7 as the related constituted data of the reference image synthesized with the infrared thermal image. The control part 10 reads the vector image data of the contour image T7 corresponding to the information of the photographed object "photographed object h7" and the position information of the reference image (the contour image T7) in the infrared thermal image, and transmits the data and the information to the temporary storage part 4.

The flash memory 7 may store the storage content as shown in FIG. 5 for responding the operation. The control part 10 reads the constituted data of the contour image T7, texture image W7, and an analyzed area F7 corresponding to the information of the photographed object "photographed object h7" and the position information of the contour image T7, the texture image W7, the analyzed area F7 in the infrared thermal image, and transmits the data and the information to the temporary storage part 4 for subsequent usage such as switching or recording (the setting needed parts may be transmitted). The control part 10 determines the vector image data of the contour image T7 as the constituted data related to the reference image synthesized with the infrared thermal image, according to the specified determined type as the contour and the type information of the vector image data of the contour image T7. If there is no specified determined type, the constituted data of the contour image T7, the texture image W7, and the analyzed area F7 related to the information of the photographed object is together determined for being used as the constituted data generating the reference image, or for reselection of the users. The user can set one or more specified determined types in a menu setting bar SZ31 of the thermal imaging device 12 as shown in FIG. 3.

The invention is not limited thereto. The control part 10 allows the display part to display the selection information related to the constituted data such as the morphological constituted data with a specified number at the specified position, according to the constituted data such as the morphological constituted data stored in the flash memory 7, for selection of the user. The selection information may be words, characters, icons, numbers, codes, or thumbnails representing the identity information of the constituted data such as the morphological constituted data, and the identity information of the constituted data may be defined or edited with different application meanings. For example, when the storage part stores a plurality of constituted data, the control part 10 may display image thumbnails generated by a specified number of the constituted data for selection of the user, the user may select the image thumbnail suitable for the photographed object according to shapes of the thumbnails, and the constituted data related to the reference image may be determined according to the selection of the user. When the storage medium stores the constituted data as a graph document or an image document, and the reference mode is entered, the control part 10 displays according to the related document name or thumbnail stored in the flash memory 7, for selection of the user. Therefore, information of the photographed object is not necessary, and the storage part may only store the constituted data such as the morphological constituted data.

In addition, the control part 10 as the reference image determining part can be used to determine the constituted data as follows. For example, certain morphological constituted data may be defaulted, and may be used for detecting the specified photographed object. Otherwise, the relationship between the specified key of the operation part and the constituted data such as the specified morphological constituted data may be predetermined, and then the constituted data such as the morphological constituted data may be determined by responding the operation of the specified key.

In addition, after the reference image generated by the determined constituted data and the infrared thermal image are synthesized and displayed, the constituted data related to the present constituted data is determined to generate the reference image after switch by responding the predetermined operation of the user such as switching of the direction keys. The constituted data related to the present constituted data may be related to the present constituted data, may be generated according to the present constituted data, or may be other constituted data related to the information of the selected photographed object. For example, the information of the photographed object may be related to a plurality of types of the constituted data, and the switch may be determined in the constituted data.

In addition, according to a predetermined trigger condition such as external trigger signals as induction or GPS signals, the constituted data related to the reference image and corresponding to the signal may be determined, through the trigger of a corresponding receiving device (not shown) of the thermal imaging device.

In addition, for example, the storage medium of the thermal imaging device 12 may store the information of the photographed object, and the constituted data related to the information of the photographed object is stored in an external device, such as a storage device or a computer, wiredly or wirelessly connected through the communication I/F 8. When the user selects the information of the photographed object, the control part 10 sends an instruction to the external device, to acquire and determine the constituted data corresponding to the information of the photographed object in a wired or wireless mode.

In the embodiment, the storage part may be a storage medium of the thermal imaging device 12, for example a nonvolatile storage medium such as the flash memory 7 or the storage card 6, or a volatile storage medium such as the temporary storage part 4, or may be other storage mediums wiredly or wirelessly connected with the thermal imaging device 12, for example other devices wiredly or wirelessly connected with the communication I/F 8, such as the storage medium of other storage devices, the thermal imaging device, or computers, or the storage medium of the network destination. Preferably, the data such as the constituted data is prestored in the thermal imaging device 12 or in the nonvolatile storage medium connected with the thermal imaging device 12.

In step S103, the specified position and the specified size of the reference image in the infrared thermal image are determined.

The control part 10 determines the specified position and the specified dimension of the contour image T7 located in the infrared thermal image according to the position information transmitted to the temporary storage part 4. For example, in FIG. 4, the flash memory 7 stores the morphological constituted data and the position information thereof. The position information represents the specified position and the specified dimension of the reference image generated by the morphological constituted data and located in the infrared thermal image, and the position determining part is used for determining the specified position and the specified dimension represented by the position information as the specified position and the specified dimension of the reference image acquired by the morphological constituted data in the infrared thermal image. In addition, the position, dimension, or rotating angles of the reference image may be determined via input of the user through the operation part, the position determining part sets the specified position and the specified dimension of the reference image according to the default position and the dimension (for example, the center point is default, an original dimension is shown, and the constituted data of the reference image with a suitable dimension may be predetermined). In addition, a specified self-adaptive area is used for determination as described in the second embodiment in detail.

In step S104, the acquired thermal imaging data is transmitted to the temporary storage part 4.

In step S105, the reference image and the infrared thermal image are synthesized. In detail, the control part 10 controls the image processing part 2 to perform corresponding specified processing for the constituted data (the vector image data) of the contour image T7 according to the determined specified dimension or rotating angles, and to synthesize the acquired image data such as the predetermined one-color image data after processing according to the specified position and the image data of the infrared thermal image acquired after specified processing of the thermal imaging data. In the embodiment, the contour image T7 may be semitransparent or opaque.

In step S106, the control part 10 as the display controlling part controls the display part 3 to display the synthesized image. That is, the reference image and the infrared thermal image are displayed together, as shown in the display interface G1103. There are larger differences between the thermal image H7 of the photographed object and the contour image T7. If there is no reference image for reference, the user fails to subjectively control the shape of the thermal image H7 of the photographed object (in actual, many users only photographed incomplete thermal images of the photographed object or with improper photographing angles), the imaging position, dimension, and angle in the infrared thermal image. The key measuring part is easy to omit, and the record infrared thermal image is not normal, thereby causing a difficult subsequent batching process.

In step S107, the control part 10 detects if a record instruction is received. If yes, the record process in step S108 is entered, and if no, the steps S104-S106 are repeated. The display part display the continuously synthesized dynamic infrared thermal image and the reference image, reflecting a continuous synthesized and displayed state of the dynamic infrared thermal image and the reference image T7 acquired by photographing. The user can understand morphological requirements of the thermal image H7 of the photographed object to be photographed and specification requirements of the imaging position, dimension, and angle in the infrared thermal image according to the visual reference of the contour image T7. Then, the thermal image H7 of the photographed object as shown in the display interface G1104 in FIG. 11 overlaps the contour image T7 in visual by adjusting the photographing distance, angle, and imaging position between the optical part of the thermal imaging device 12 and the photographed object h7. At this moment, the user can send the record instruction through the operation part, entering step S108.

In addition, the record instruction is not limited to send by the users. For example, when the control part 10 determines that the thermal image of the photographed object matches the reference image or a feature template, the record instruction is send to record.

In addition, when the flash memory 7 stores the storage content as shown in FIG. 5, the user can switch to display the reference image of other types for reference. In detail, the control part 10 responds switching operation of the user, determines other types of the constituted data related to the information of the photographed object or the contour image T7, such as the analyzed area F7 and the texture image W7, transmitted to the temporary storage part 4 in the step S102, and synthesizes singly the infrared thermal image (not shown in FIG. 11) or together with the contour image T7, to strengthen the reference effect.

In addition, the position, dimension, or rotating angle of the contour image T7 are adjusted (redefined) to match the thermal image H7 of the photographed object as shown in the display interface G1103.

In step S108, recording is performed.

The control part 10 as the recording part is used for recording infrared data, and the infrared data is the thermal imaging data acquired by the photographing part 1 and/or data acquired after specified processing for the thermal imaging data acquired by the photographing part 1. Then, step S109 is entered.

In detail, in one embodiment, for responding predetermined record operation, the control part 10 controls the infrared detector to read signals to acquire the thermal imaging data, allowing the image processing part 2 to perform a specified thermal imaging data compressing process (may be static or dynamic) for the thermal imaging data or perform a compressing process for the thermal imaging data after a specified process such as correction or interpolation, thereby storing to the temporary storage part 4 and recording the compressed thermal image to the storage card 6. When the thermal image H7 of the photographed object matches the reference image in FIG. 13, the record thermal image data includes the infrared thermal image H7 of the photographed object, and the imaging shape of the thermal image H7 of the photographed object and the imaging position, dimension, and angle in the infrared thermal image conform to the expected normative requirements of the contour image T7 as the reference image.

The infrared data is not limited to the frame of the thermal imaging data acquired by reading signals via the infrared detector at the time of responding record operation or determining record conditions conforming to the rule. According to different application, the record infrared data may be the specified thermal imaging data in the frames of the thermal imaging data acquired by the photographing part 1 and temporarily stored in the temporary storage part 4 at the time of responding the record instruction or determining record conditions conforming to the rule (or the after specified time) and/or the data acquired after specified processing for the thermal imaging data (the specified processing may be modification, interpolation, pseudo-color, conversion of temperature values, reduction of pixels, compression, or a combination thereof). The infrared data may be the frame of the thermal imaging data that a record temperature exceeds a predetermined threshold. In addition, the infrared data may also be a plurality of frames of the thermal imaging data with a specified number, such as the frames of the thermal imaging data continuously record, or the thermal imaging data (frame) acquired after specified processing for a plurality of frames of the thermal imaging data with the specified number, such as one frame of the thermal imaging data acquired after integral operation for the frames of the thermal imaging data stored in the temporary storage part 4. The infrared data may be one or a combination thereof. For example, the temperature value of each pixel acquired by the thermal imaging data and image data of the infrared thermal image may be record at the same time.

The better mode is to build related record between the specified record information and the infrared data, and the specified record information includes at least the following information.

1) Information Representing the Information of the Photographed Object

The information of the photographed object is the information of the selected photographed object. The information representing the information of the photographed object may be the information of the photographed object, one part of the information of the photographed object, or index information to which the information of the photographed object corresponds. For example, in the embodiment, the information of the photographed object h7 is built relation with the infrared data and record. When the information of the photographed object includes constituted information such as an equipment type, a number, or a place, the whole or one part such as a record number may be record.

2) The Constituted Data of the Reference Image or the Constituted Data of Data Having the Specified Relative Position Relation with the Reference Image When the reference image is acquired by determining more constituted data, one or more constituted data of the reference image may be record.

The constituted data of the object having the specified relative position relation with the reference image may be the constituted data related to the constituted data of the reference image. In the embodiment, the record information is vector image data of the contour image T7. When the vector image data of the contour image T7 is further related to other constituted data such as the constituted data of the analyzed area F7 or lattice data of the texture image W7, other constituted data such as the constituted data of the analyzed area F7 may also be record. The constituted data, which is related via the information of the photographed object, may be the constituted data related to the selected information of the photographed object. When more constituted data is related, the constituted data may be one or more. Although the determined constituted data is the vector image data of the contour image T7, when more of the constituted data is related, the vector image data of the contour image T7 may not be record, and the constituted data of the analyzed area F7 may be record. The users can set the specified record type of the constituted data in a menu setting bar SZ35 in FIG. 3, such as setting the contour, the texture, the constituted data of the analyzed area, or a combination thereof.

The constituted data of the object having the specified relative position relation with the reference image may be the constituted data acquired under a specified processing rule for an assigned processing object. The processing object may be the morphological constituted data of the assigned reference image or related other morphological constituted data (with the specified relative position relation), which is described in detail in the following embodiments.

The constituted data of the object having the specified relative position relation with the reference image may be the constituted data acquired under a specified computing rule for an assigned computing object. The computing object may be the constituted data of the assigned reference image or related other constituted data (with the specified relative position relation), which is described in detail in the following embodiments.

3) The Position Information in the Infrared Thermal Image of the Reference Image or the Object Having the Specified Relative Position Relation with the Reference Image For example, in the embodiment, when the information of the photographed object h7 is related to the vector image data of the contour image T7, the lattice data of the texture image W7, and the constituted data of the analyzed area F7, the position parameters of the respective object in the infrared thermal image acquired by the constituted data may be record, and one or more may be stored.

In addition, the position information includes the position parameters and/or rules related to the position parameters. For example, the parameter information of the self-adaptive area may be record to be the position information, and then the position parameter of the contour image T7 may be reappeared according to the parameter information (referring to the second embodiment in detail).

4) The Identity Information of the Constituted Data of the Reference Image or the Identity Information of the Object Having the Specified Relative Position Relation with the Reference Image When the constituted data stored in the storage part has corresponding identity information (such as number of the constituted data or index information), related record between the identity information and the infrared data may be built.

The related record is to record information convenient for the subsequent batch processing. The information of the photographed object is record to facilitate classifying the infrared data, and the classified infrared data may be analyzed in batch according to the database of the storage content in FIG. 5 and the corresponding analyzed area set via the information of the photographed object. The morphological constituted data capable of acquiring the shape of the photographed object and/or the position information may be record to be convenient for setting the analyzed area to which the reference image corresponds or adjusting again. The analyzed area may be record to facilitate the subsequent batch processing and analysis. Preferably, the information of the photographed object, the constituted data of the contour image T7, the position information of the contour image in the infrared thermal image, the constituted data of the analyzed area F7, and the position information of the analyzed area in the infrared thermal image may be record at the same time.

About the related record processing, the specified record information may be used as additional information of the infrared data with a specified format. In one embodiment, the control part 10 may respond a record instruction sent by a user, and control the infrared detector to read the signal at that moment, to acquire the thermal imaging data. The image processing part 2 may perform specified processing such as compression for the thermal imaging data or may perform compression after the specified processing such as modification or interpolation for the thermal imaging data which can be stored in the temporary storage part 4. The control part 10 controls the specified record information in the temporary storage part 4 to relate with the compressed thermal imaging data and to be record to the storage card 6, and the processing is end. In addition, the compression may be performed after the information is added. In addition, the related record processing may be that the specified record information may be record in a information document or an index document related to a thermal image document, and the control part 10 as the recording part can generate the information document or the index document.

Figure 12:
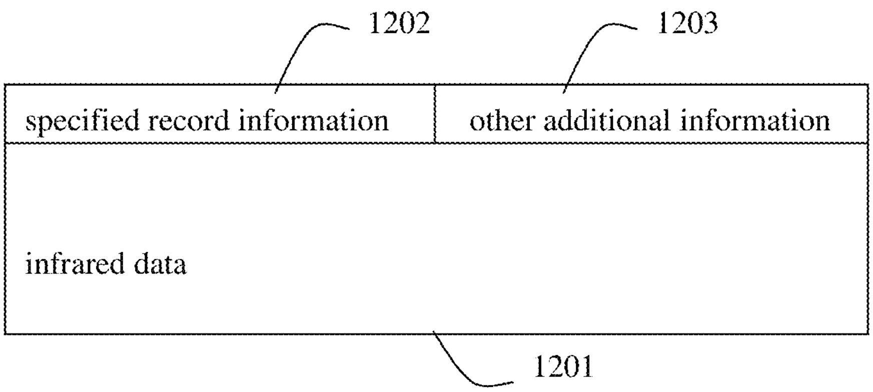
FIG. 12 is a schematic diagram showing a data structure of a record thermal image document.

FIG. 12 is a schematic diagram showing a thermal image document including the specified record information. The infrared data 1201 is the compressed thermal imaging data. The specified record information 1202 may be the photographed object h7, the constituted data of the contour image T7, the constituted data of the analyzed area F7, the position information of the contour image T7 located in the infrared thermal image, or the position information of the analyzed area F7 located in the infrared thermal image. Other additional information 1203 may be photographing time.

The "position information of T7" shows the position and dimension of the thermal image H7 of the photographed object located in an infrared thermal image IR0 as shown in the display interface G1104 in FIG. 11. The "position information of F7" shows the specified position and specified dimension of the analyzed area F7 located in the infrared thermal image IR0 and may be acquired according to the position information related to the constituted data of the analyzed area F7.

Figure 13:
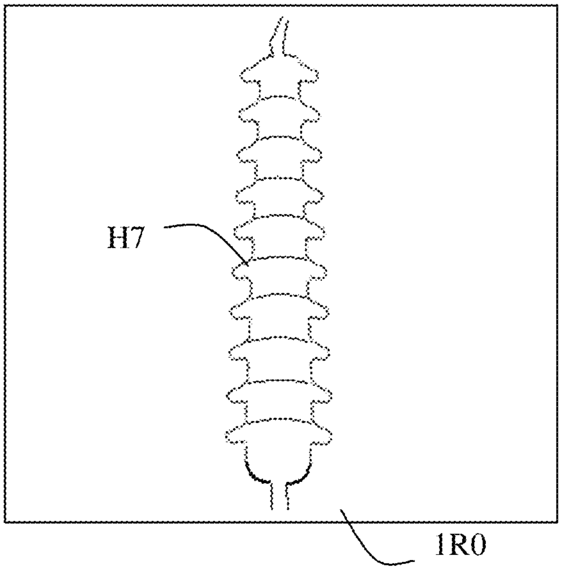
FIG. 13 is a schematic diagram showing a record infrared thermal image including a thermal image of a photographed object when the thermal image of the photographed object matches the reference image.

FIG. 13 is a schematic diagram showing the infrared thermal image IR0 to which the record thermal imaging data corresponds when matching the reference image T7. The position and dimension of the thermal image H7 of the photographed object located in the infrared thermal image IR0 and the position information of the contour image T7 represent the position and dimension of H7 located in the infrared thermal image IR0.

In addition, the record storage medium is not limited to the storage card 6 or the flash memory 7, and it may a network destination via communication I/F 8.

In addition, a name of a thermal image document may be generated according to the information of the photographed object. The recording part has a document name generating unit for generating the document name of the thermal image document. The document name at least includes information related to the assigned information of the photographed object, such as the generated document name of the thermal image: photographed object h7.jpg. Preferably, the document name including the classifying information may be generated according to the classifying information in the information of the photographed object, and further it may combine with time information "20080222" to generate the document name, such as photographed object h7-20080222.jpg. The related record is to record information needed by the subsequent batch processing and analysis, and the document name includes the information of the photographed object, thereby facilitating checking of users. The document name including the discernible classifying information is generated according to the classifying information in the information of the photographed object, facilitating reading and recognizing the classifying information in the document name during the subsequent batch processing and analysis.

In addition, if the position, dimension, and rotating angle of the contour image T7 are adjusted (redefined) to match the thermal image H7 of the photographed object as shown in the display interface G1103, the control part 10 responds the predetermined record instruction. For example, the user sends the record instruction via the operation part when the contour image T7 is adjusted to match H7 of the photographed object. The record of the position, dimension, and rotating angle of the adjusted contour image T7 in the infrared thermal image is substantial to the record of the position information (the position, dimension, and rotating angle) of the thermal image H7 of the photographed object in the infrared thermal image. The contour image T7 is used to measure and record the position information (the position, dimension, rotating angle) of the thermal image H7 of the photographed object in the infrared thermal image as shown in the display interface G1103, thereby facilitating the subsequent analysis.

In step S109, the control part 10 performs control and monitors if the user withdraws from the reference mode.

If yes, the reference record mode is end. If no, return to the step S104, and the user can record again.

In addition, the control part 10 further includes a transparent object assigned part, for users to assign the object which needs to change the transparency ratio (such as the reference image T7 in the embodiment) in the reference image displayed by the display part and for responding predetermined operation of the user to change the transparency ratio of the assigned object.

In the embodiment, since the information of the photographed object and the morphological constituted data related to the information of the photographed object is prestored, the suitable constituted data can be selected conveniently according to the photographed object at the photographing scene. According to the position information related to the determined constituted data, the specified position and specified dimension of the reference image generated by the determined constituted data to be located in the infrared thermal image may be determined. The specified position and the specified dimension are presented in the synthesized image and correspond to the reference image reflecting the specified morphological characters of the photographed object, which provides a visual reference for the specified morphological characters of the thermal image of the photographed object and the imaging position, dimension, and angle of the thermal image of the photographed object in the infrared thermal image. Obviously, according to the reference of the reference image, the users are perfectly clear about the photographing requirement, without excessively depending on experience accumulation and subjective consciousness, which can reduce photographing difficulty substantially and improve the detecting quality and speed. Thus, ordinary users can easily master the photographing skill. When the record is performed after the image of the specified morphological characters represented by the reference image matches the thermal image of the photographed object, the normative thermal image of the photographed object can be acquired. Further, since the contour morphological constituted data is used to form the reference image, the reference effect is better. The specified record information and the infrared data is related and stored, thereby facilitating the subsequent computer batching. However, any product for carrying out the embodiment of the invention does not need to achieve all the advantages at the same time.

Figure 14:
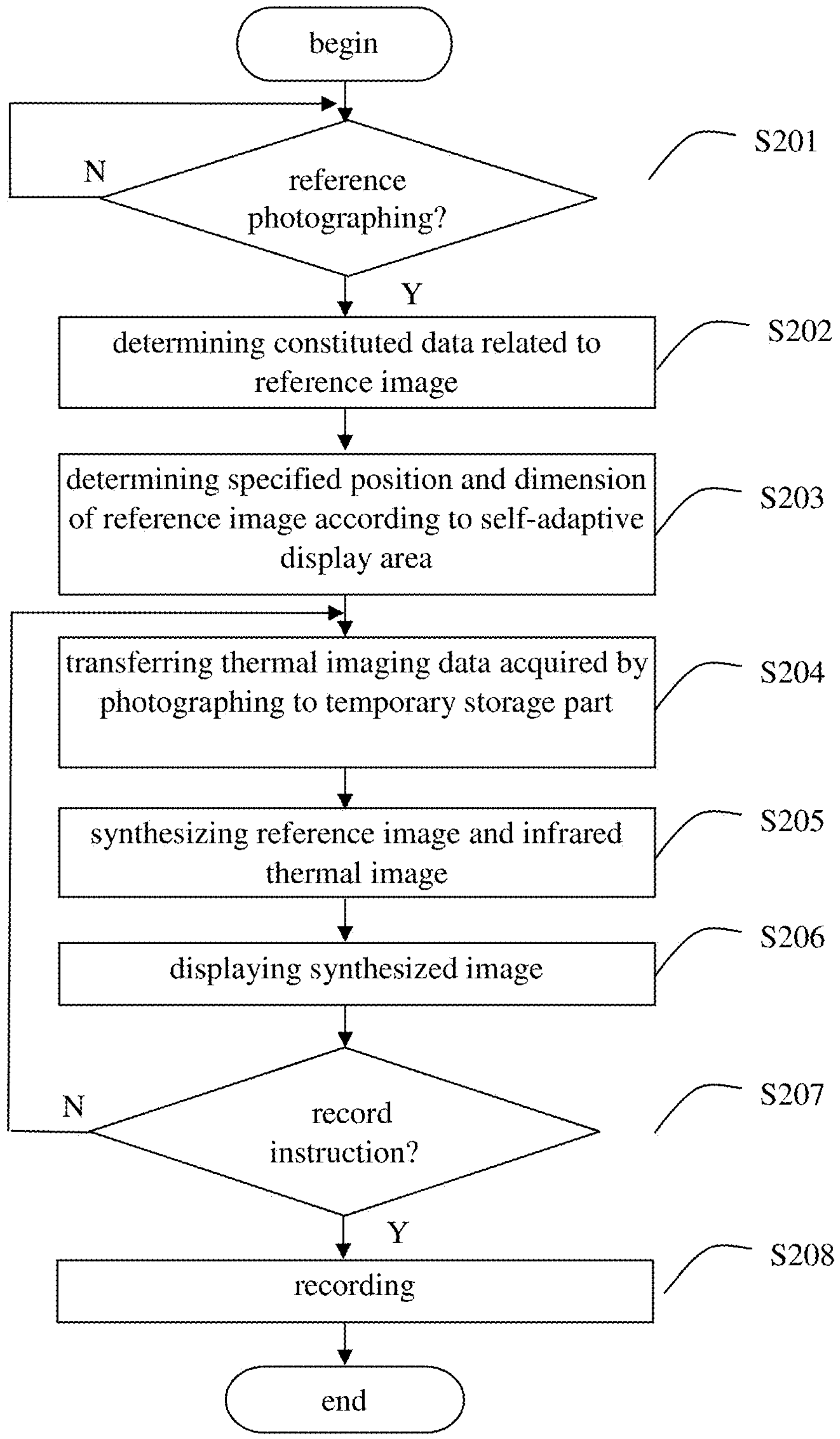
FIG. 14 is a flow chart showing (self-adaptive display) a reference record mode.
Figure 19:
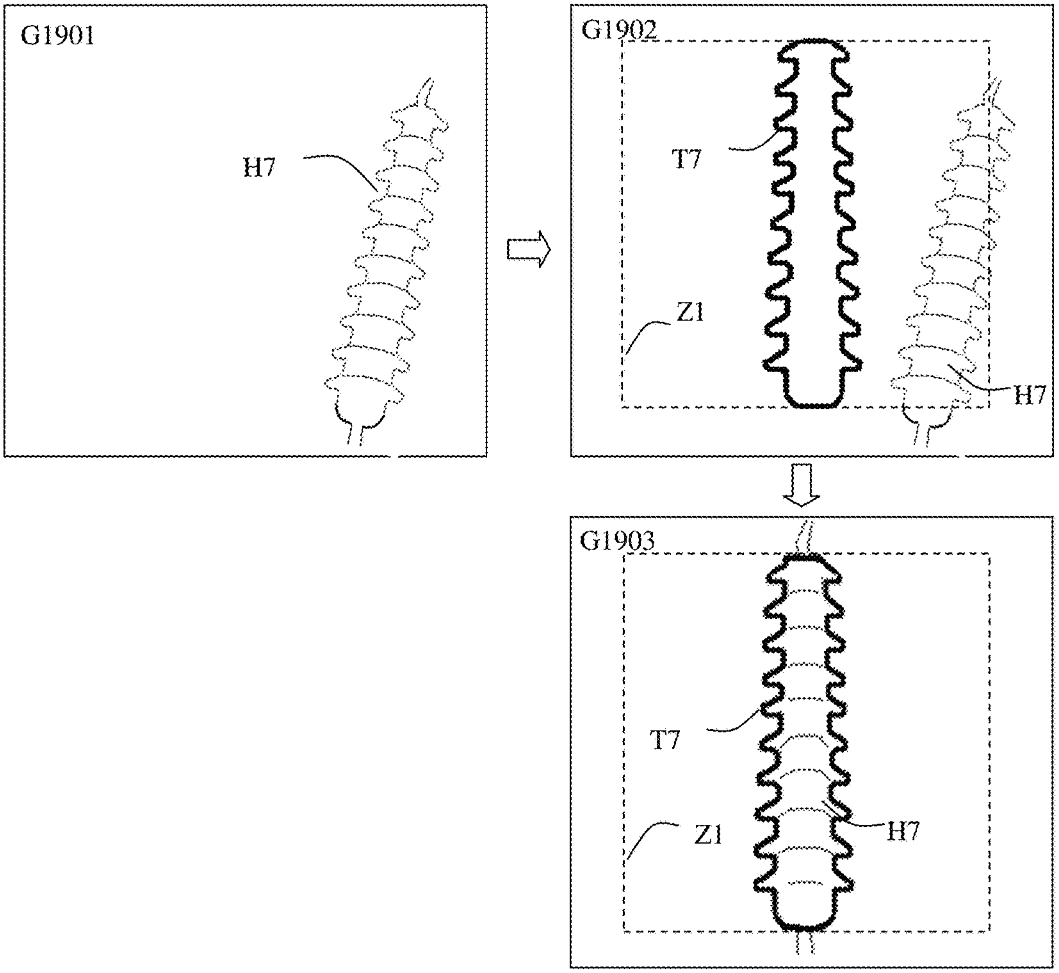
FIG. 19 is a schematic diagram showing a display interface of a photographing process for a photographed object when a "centering reference image" process is performed.

The difference between the first embodiment and the second embodiment is that in the thermal imaging device 12 with the same structure as shown in FIG. 1, the flash memory 7 stores control programs for allowing the reference image to self-adaptively display in a self-adaptive area in the second embodiment. FIG. 14 is a flow chart showing a (self-adaptive display) reference record mode. FIG. 15 is a schematic diagram showing a self-adaptive display effect after performing a "centering reference image" process for a local contour image. FIG. 16 is a schematic diagram showing a self-adaptive display effect after performing a "centering reference range" process for the local contour image. FIG. 17 is a schematic diagram showing the information of the photographed object and the morphological constituted data stored in the storage part in another way. FIG. 18 is a schematic diagram showing the information of the photographed object and a plurality of types of the constituted data stored in the storage part in another way. FIG. 19 is a schematic diagram showing a display interface of the photographed object in a photographing process when the reference image is used for a "centering reference image" process.

In the embodiment, the control part 10 as the position determining part determines the specified position and the specified dimension of the reference image in the infrared thermal image according to the size and position of the self-adaptive area in the infrared thermal image and the position of the reference image in the self-adaptive area.

The self-adaptive area is the specified area for self-adaptively displaying the reference image in the infrared thermal image, and the self-adaptive display is the non-overflow maximization display with a fixed aspect ratio in the self-adaptive area by the reference image in the specified position of the self-adaptive area. In the embodiment, the angle is unchangeable, while the angle may be changeable.

Usually, the thermal image of the expected photographed object has a specified dimension and is centered, and the self-adaptive area can be convenient for normatively displaying the reference image. The self-adaptive area bar SZ32 in FIG. 3 is used for setting the position and dimension of the self-adaptive area in the infrared thermal image, such as a window scale of the infrared thermal image or an assigned area in the infrared thermal image. The reference image position bar SZ33 is used for setting the position of the reference image in the self-adaptive area, such as setting "centering reference image" or "centering reference range", which is not limited to the center point, also may be other assigned positions or have rotating angles. When the setting is finished, the setting may be stored as the default self-adaptive setting parameters.

The control part 10 is used for computing the specified position and the specified dimension of the reference image in the infrared thermal image after the reference image is zoomed self-adaptively. For example, the self-adaptive area is set in the center of the infrared thermal image, and the reference image is set "centering reference image" in the self-adaptive area. The control part 10 computes ratios of X-axis and Y-axis between the self-adaptive area (dimension X1, Y1) and the reference image (the dimension X2, Y2 of the reference image before scaling), and selects the smaller one of X1/X2 and Y1/Y2 as a scaling ratio based on a center point of the reference image when the reference image is centered, thus to acquire the specified position and the specified dimension of the self-adaptively displayed reference image located in the infrared thermal image. In FIG. 15, a display effect of self-adaptive "centering reference image" of the local contour image T15 is shown.

In addition, centering the reference image further includes the following condition. When a plurality of types of the constituted data is determined as the constituted data related to the reference image, the control part 10 is used for combining the determined constituted data as a combined object, to acquire a combined reference image and to compute self-adaptively displayed position and dimension of the combined reference image. At this moment, the processing of "centering reference image" may display the combined reference image in center. The image generated by each type of the combination of the constituted data may not be displayed.

However, when the image generated by the constituted data representing the local specified morphological characters of the photographed object is performed "centering reference image" processing, the image (the reference image or part of the reference image) generated by the constituted data may not represent the reference range of the expected photographed object. For example, the reference image in FIG. 15 fails to be used for photographing the photographed object as a whole. To further specify the specified position and specified dimension of the reference image generated by the constituted data in the infrared thermal image, a common reference range area can be set for the image generated by the constituted data. The reference range area, to which the reference image corresponds, represents the displayed reference range of the reference image, and stores the position information (a position, a dimension, or a rotating angle) of the image relative to the reference range area and generated by each of the constituted data in the plurality of the constituted data corresponding to the same photographed object, thus to allow the image generated by the constituted data to keep the relative position specification with the reference range area. When the reference image has the corresponding reference range area, the processing of "centering reference range" is self-adaptive centering of the reference range area, and the relative position (the position, the dimension, or the rotating angle) between the reference image after self-adaptive processing and the reference range area remains the same.

In one aspect, the application of the reference range area can avoid the condition that the reference image reflecting the local specified morphological characters of the photographed object is too large to be displayed. For example, a bounding rectangle with a complete contour may be used as the reference range area of the reference image of the local contour. In FIG. 16, the displayed effect of "centering reference range" of the local contour image T15 is shown, which is different from "centering reference image" of the local contour image T15 in FIG. 15. In FIG. 16, the local contour image T15 corresponds to the reference range area L15 which may be not displayed. The reference range area may be prestored, such as stored related to the constituted data, may be input by users, may be one of the constituted data related to the reference image, or may be computed after combining a plurality of types of the constituted data.

In another aspect, the key observation part of the users can be used as the reference range area, further to improve the reference effect. For example, the analyzed area may be used as the reference range area. At that moment, although one part of the reference image may be overflowed, the overflow suitable for application needs may be acceptable. Thus, the users can approach the photographed object for photographing, with the reference of the reference image and protecting the photographing quality. The change of different display positions can be realized via changing the reference range area, to realize different photographing aims.

The control part 10 is used for computing and determining the specified position and the specified dimension of the reference image located in the infrared thermal image generated by the constituted data according to the position and dimension of the predetermined self-adaptive area in the infrared thermal image and the position of the reference range area in the self-adaptive area to which the image generated by the determined constituted data corresponds. For example, the specified position and specified dimension of the reference image located in the infrared thermal image during "centering reference range" are computed, first computing ratios of X-axis and Y-axis between the self-adaptive area (dimension X1, Y1) and the reference range area (the dimension X3, Y3 before scaling) and selecting the smaller one of X1/X3 and Y1/Y3 as a scaling ratio based on a center point of the reference range area when the reference range area is self-adaptively centered. Then according to the relative position (the position, the dimension, or the rotating angle) of the reference image (before scaling) in the reference range area (before scaling), the scaling ratio during self-adaptive centering of the reference range area is used as the scaling ratio of the reference image based on the center point of the reference range area, to compute the specified position and specified dimension of the reference image located in the infrared thermal image during the self-adaptive centering of the reference range area.

In the embodiment, the storage content in one storage embodiment as shown in FIG. 17 includes the information of the photographed object and the morphological constituted data related to the information of the photographed object, without the position information of the reference image generated by the contour morphological constituted data in the infrared thermal image.

The storage content in another storage embodiment as shown in FIG. 18 includes information of the photographed object, the constituted data with the type information related to the information of the photographed object, and the position information (such as, storing the position, the dimension, or the rotating angle in the contour) of the image (before scaling) acquired by the constituted data relative to the contour (before scaling). When the specified position and the specified dimension of other constituted data are determined, the bounding rectangle of the contour can be used as the reference range area of the image acquired by other constituted data, and the position information of the reference image in the infrared thermal image generated by the contour morphological constituted data may not be stored. In addition, the bounding rectangle of the combined reference image acquired after combining a plurality of the constituted data (such as the constituted data related to the information of the photographed object stored in FIG. 18) is used as the reference range area of the image generated by the constituted data, storing the position and dimension information of the image relative to the reference range area and generated by each of the constituted data of a plurality of the constituted data. Preferably, the storage part (the flash memory 7) stores the constituted data, the reference range area corresponding to the image generated by the constituted data, and the specified relative position relation (such as, storing the position, the dimension, or the rotating angle in the reference range area) of the image generated by the constituted data relative to the reference range area.

According to the embodiment in FIG. 5, the specified relative position relation (also called the specified relative position relation of the constituted data in the following text) of the objects acquired by the constituted data related to the information of the same photographed object is stored. According to the embodiment in FIG. 18, the position information of the objects respectively located in the same reference system (such as in the infrared thermal image) and acquired by the different type of the constituted data related to the information of the same photographed object is stored. However, the invention is not limited thereto. For example, the specified relative position relation of the objects acquired by the constituted data may be set by users, or the specified relative position relation of the objects acquired by the constituted data may be set by a default position rule of the thermal imaging device 12.

A reference photographing process of the self-adaptive area in FIG. 14 is described hereinbelow, and in the embodiment, the set self-adaptive area Z1 and "centering reference image" are described.

In step S201, in a standby photographing state, the display part displays the dynamic infrared thermal image, such as the display interface G1901 in FIG. 19, and the control part 10 performs control. When the users select the reference record mode, step S202 is entered.

In step S202, the constituted data for generating the reference image is determined as the vector image data of the contour image T7. See also the step S102 for the determined processing mode.

In step S203, according to the self-adaptive area, the specified position and specified dimension of the reference image in the infrared thermal image are determined.

The control part 10 as the position determining part, according to the size and position of the self-adaptive area Z1 in the infrared thermal image and the centering position of the contour image T7 in the self-adaptive area Z1, determines the specified position and specified dimension of the contour image T7 in the infrared thermal image.

In step S204, the acquired thermal imaging data is transmitted to the temporary storage part 4.

In step S205, the control part 10 controls the image processing part 2 to perform corresponding processing for the constituted data (the vector image data) of the contour image T7 according to the determined specified dimension and to synthesize the image data of the contour image T7 after processing and the image data acquired by the thermal imaging data after specified processing according to the specified position.

In step S206, the control part 10 as the display controlling part controls the display part 3 to display the synthesized image as shown in the display interface G1902 in FIG. 19.

In step S207, the control part 10 detects if a record instruction is received. If yes, step S208 is entered. If no, the steps S204-S206 are repeated, which reflects a photographing adjusting process according to the reference image T7 by the users. When the thermal image H7 of the photographed object matches the contour image T7 as shown in the display interface G1903 in FIG. 19, the user sends the record instruction via the operation part, and the step S208 is entered.

In step S208, recording is performed.

The control part 10 as the recording part builds related record between the specified record information and the infrared data. In the embodiment, the related record between the constituted data and the position information such the position and dimension of the contour image T7 and the infrared data is built. The difference with the first embodiment is that when the position information is record, the parameter information of the self-adaptive area can be record as the position information, and the position of the contour image T7 can be reappeared according to the parameter information. Then, the reference record mode may be end, or return to the step S204 for recording again.

Further, if the analyzed area F7 and the position and dimension thereof located in the infrared thermal image are record, different from the table in FIG. 5 in the first embodiment, in the table 20 in the flash memory 7, the constituted data of the analyzed area F7 is not related to the position information in the infrared thermal image, which can be acquired according to the position information of the analyzed area F7 relative to the contour image T7 and the specified position and specified dimension of the contour image T7 located in the infrared thermal image. When the specified position and the specified dimension of the reference image T7 in the infrared thermal image are set, the position and dimension of the analyzed area F7 located in the infrared thermal image may also be set and be stored in the specified area of the temporary storage part 4 for the subsequent use. When recording is performed, the position parameter of the analyzed area F7 located in the infrared thermal image may be set. In addition, if the constituted data which needs to record is generated (by processing and/or computing), when the constituted data of the reference image is assigned, the constituted data which needs to record and the position parameter in the infrared thermal image can be generated. When recording is performed, the constituted data which needs to record can be generated.

According to the above, according to the size and position of the specified self-adaptive area in the synthesized image and the position of the reference image in the self-adaptive area, the position and dimension of the reference image displayed in the infrared thermal image are determined. Therefore, display of the reference image is more normative, and the user is convenient for understanding the display of the reference image.

The difference between the third embodiment and the first embodiment is that in the thermal imaging device 12 with the same structure as shown in FIG. 1, the flash memory 7 stores the constituted data related to the reference image by determining the specified thermal imaging data acquired by the photographing part or the infrared thermal image acquired by the thermal imaging data for responding predetermined operation, the morphological constituted data by further processing of the constituted data, or control programs of the acquired reference image in the third embodiment. The normative photographing method (the processing reference record mode including a processing mode and a reference record mode) is described as follows. The processing object assigned part (the control part 10) is used for assigning the processing object. The image handling part (the image processing part 2) is used for performing cutting, edge extracting, or threshold range extracting for the processing object. The storage part (the temporary storage part 4, etc.) is used for storing the morphological constituted data acquired by processing. The reference image determining part (the control part 10) is used for determining the morphological constituted data acquired by processing as the constituted data related to the reference image and synthesized with the infrared thermal image.

Figure 20:
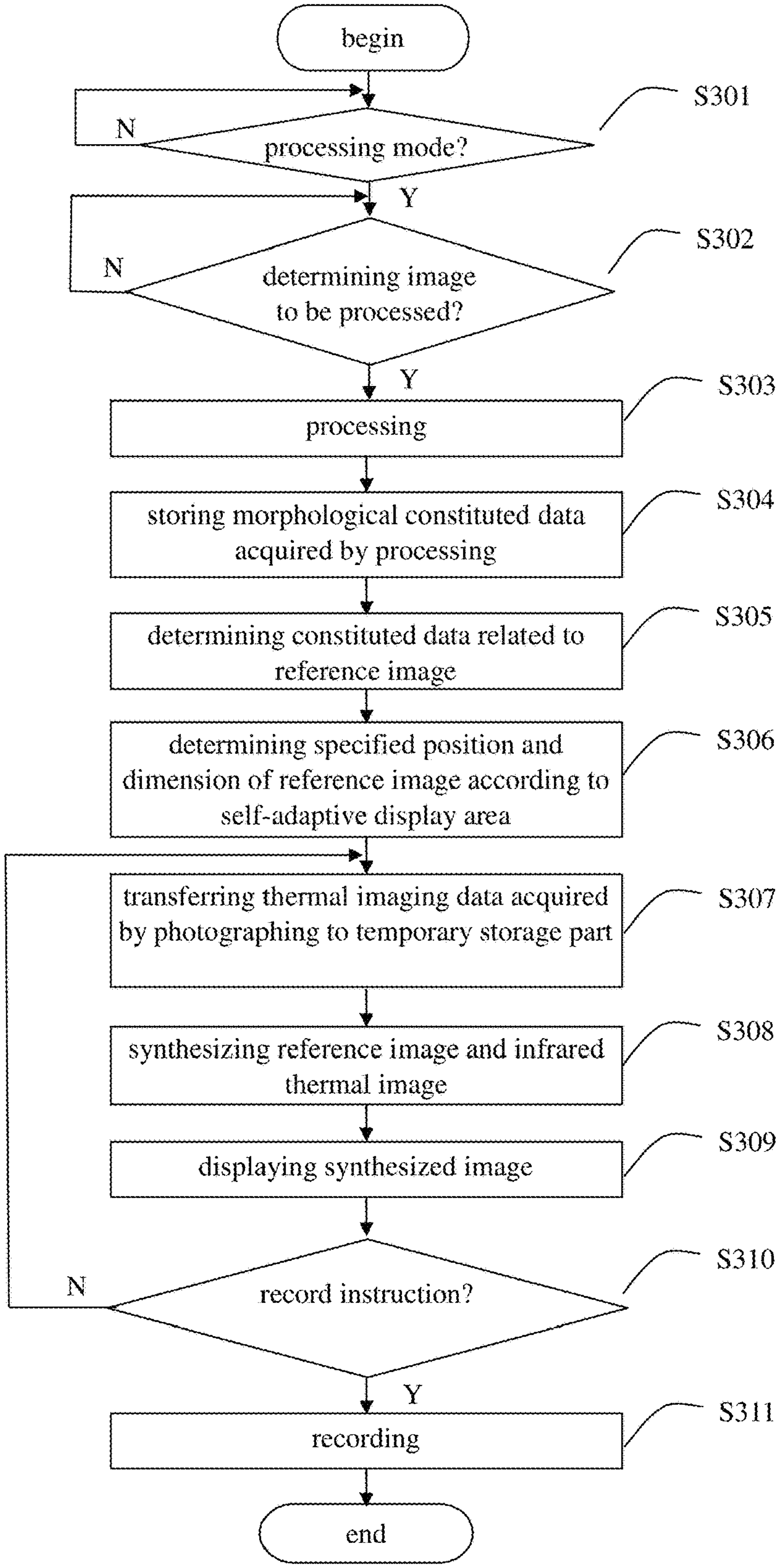
FIG. 20 is a flow chart showing a processing reference record mode.
Figure 21:
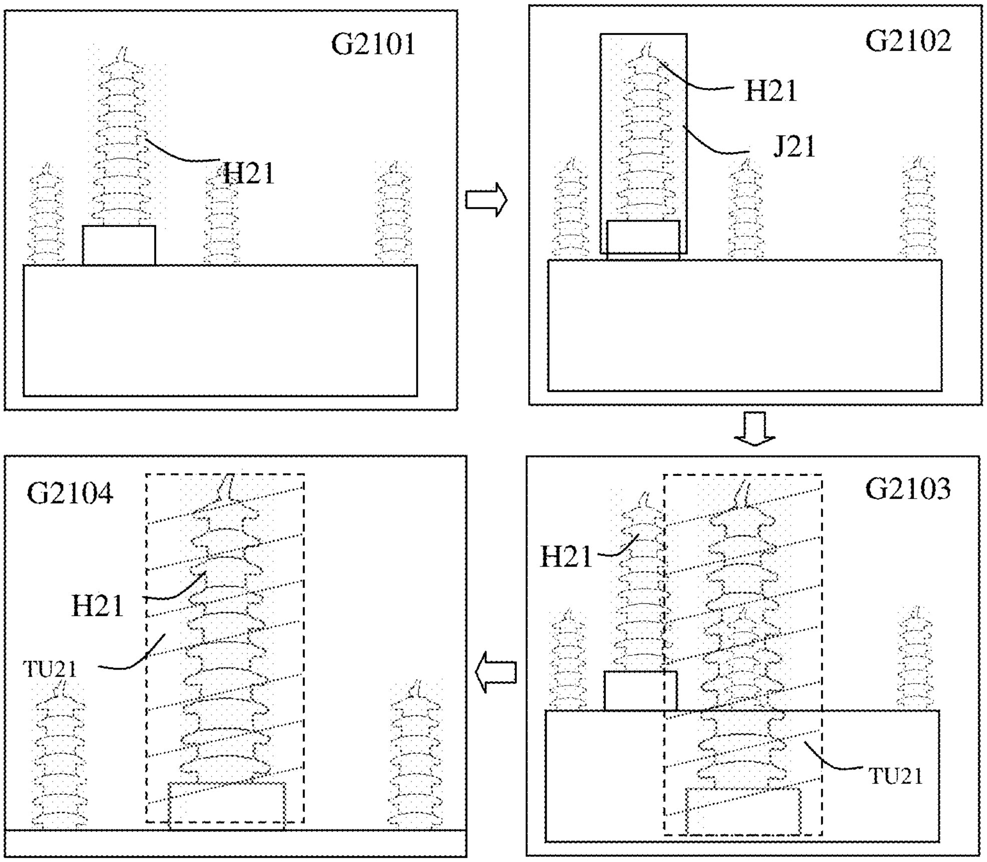
FIG. 21 is a schematic diagram showing a reference photographing display interface of acquiring morphological constituted data through cutting processing and generating a reference image by the morphological constituted data.
Figure 22:
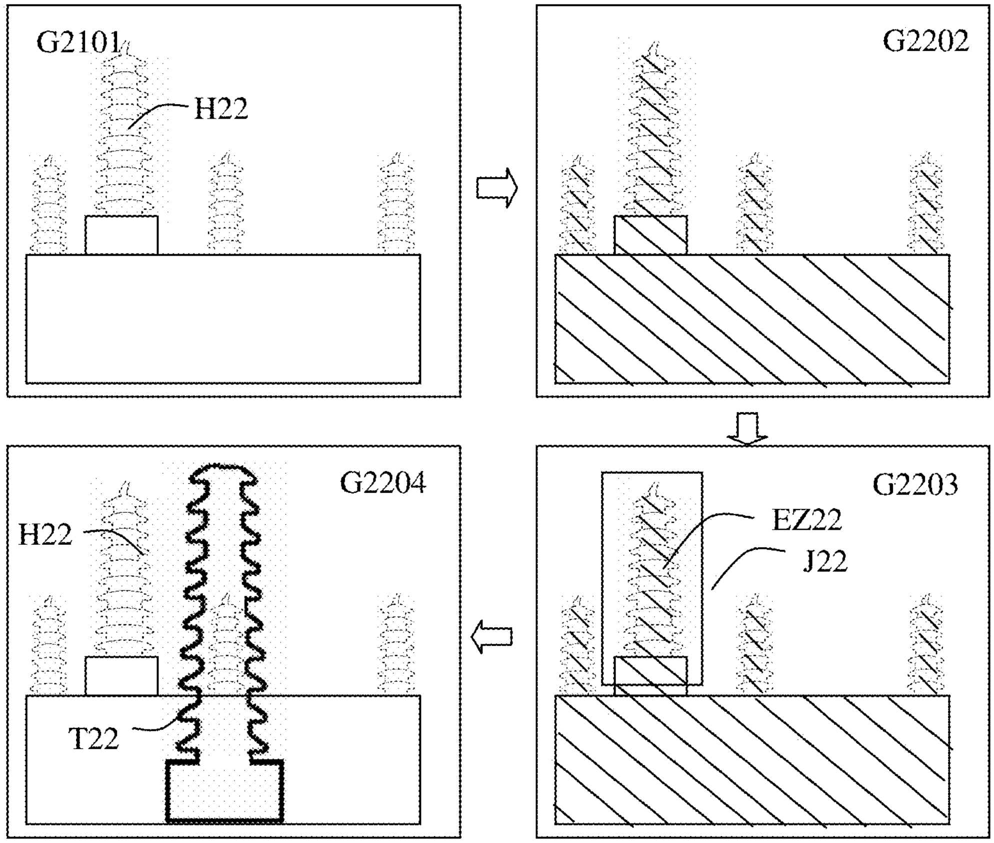
FIG. 22 is a schematic diagram showing a display interface of a process for acquiring the morphological constituted data by edge extracting and generating the reference image.

FIG. 20 is a flow chart showing a processing reference record mode. FIG. 21 is a schematic diagram showing a photographing display interface of acquiring the morphological constituted data through cutting processing and generating the reference image by the morphological constituted data. FIG. 22 is a schematic diagram showing a display interface of a process for acquiring the morphological constituted data by edge extracting and generating the reference image. This embodiment is based on the following using scene. Infrared detection for a photographed object h21 is performed in a converting station. Different from the first embodiment, the flash memory 7 does not store the morphological constituted data corresponding to the photographed object h21. To guarantee photographing quality and to guarantee that the subsequent similar photographing object can conform to unified specified quality specification especially after the proper photographing position and angle are selected, the users can correct the morphological constituted data via the thermal imaging device and perform the normative photographing via the reference image. The control steps in the processing reference photographing are as follows.

In step S301, the display part displays a dynamic infrared thermal image. The control part 10 performs the control and continuously monitors if the user selects a processing mode. At that moment, to the infrared thermal image as shown in the interface G2101 by the display part, in the past, the user may be confused about the photographing distance and angle of the thermal image H21 of the photographed object h21. At this moment, the cutting processing mode is selected via the mode key of the operation part 9, thus to enter into the step S302. The user can select the processing type at the processing menu setting bar SZ34 in FIG. 3.

In step S302, the control part 10 continuously monitors if the user sends an instruction for assigning a processing object. For responding selection of the cutting processing mode, the control part 10 controls the display part 3 to display a rectangular cutting area J21, and the user adjusts the photographing angle and distance of the photographed object h21 or adjusts the cutting area J21, to expect for acquiring the morphological constituted data or to allow the thermal image H21 of the photographed object of the reference image to be located in the cutting area J21, as shown in G2102. Then, as the enter key is pressed, the control part 10 responds the operation, for example, using an infrared detector to read signals at that time and storing the acquired thermal imaging data to a specified area of the temporary storage part 4, and the control part 10 determines the thermal imaging data or the acquired thermal imaging data after the specified processing as the processing object, then entering the step S303. In the embodiment, the infrared thermal image acquired by the thermal imaging data after the specified processing (such as the pseudo-color processing) is determined as the processing object. As the pseudo-color transformation needs to be performed for the reference image generated by the morphological constituted data acquired by the processing in the subsequence, the thermal imaging data as the processing object is more suitable. In addition, when the thermal imaging device 12 includes imaging devices of other types, images captured by other imaging devices, such as images captured by the visible camera (not shown in FIG. 1) in the thermal imaging device 12, may be used as the processing object. In addition, the processing object may also be selected from the storage medium. For example, the prestored infrared thermal image, visible images, or other morphological constituted data read from the storage card 6 may be used as the processing object.

In step S303, the processing for the processing object is performed. Based on the control of the control part 10, the image processing part 2 as the image handling part extracts the thermal imaging data in the cutting area J21, and the next step is entered.

The processing may be specified image processing performed for the processing object, such as cutting, character extracting (such as threshold range extracting or edge extracting), enhancement, filtering, pseudo-color, brightness adjusting, color adjusting, or a combination thereof.

The cutting is to extract data of the processing object located in the cutting area (such as the image data or the thermal imaging data).

The threshold range extracting is to extract data of the processing object located in a threshold range (such as extracting a temperature band or a color band regarding the infrared thermal image) according to a specified algorithm. The threshold range may be a set AD value range of the thermal imaging data, a temperature threshold range, a gray-scale range, or a color-code range, and it may be a prestored threshold range or may be set or adjusted by the user according to the displayed infrared thermal image.

The edge extracting is to extract data of the edge contour of the photographed object in the processing object according to a specified algorithm. For example, binaryzation may be performed for the determined processing object according to a specified threshold range. The specified threshold range may be a prestored threshold range or may display a binary image, and the binaryzation threshold range may be set by users. The threshold range may be a set AD value range of the thermal imaging data, a temperature threshold range, a gray-scale range, or a color-code range. Then, a connected region of the image after the binaryzation is processed. Then, an edge detecting processing is performed for the connected region, thus to acquire edge contour data. Further, a vector processing is performed for the acquired edge contour image. For example, the processing object may be the infrared thermal image as shown in G2201 in FIG. 22. First, the infrared thermal image after the binaryzation is shown in G2202 in FIG. 22 (capable of displaying or not displaying). Then, the cutting area J22 is set, as shown in G2203 in FIG. 22, to determine an expected extracted area J22. Further, edge contour data of a binary thermal image EZ22 in G2203 is extracted, and is centered and self-adaptively displayed as the contour image T22 in G2204.

Other detailed processing methods may adopt mature methods in the field, and it is not described in detail here.

In step S304, the morphological constituted data acquired by the processing is stored, and the morphological constituted data acquired by the cutting is stored in the temporary storage part 4. In the embodiment, the morphological constituted data acquired by the processing may also be stored in the storage card 6 or the flash memory 7, or the setting mode in the fourth embodiment may be entered.

In step S305, the morphological constituted data acquired by the processing is determined as the constituted data related to the reference image.

The control part 10 as the reference image determining part determines the morphological constituted data acquired by the processing and stored in the storage part (such as the temporary storage part 4) as the constituted data related to the reference image synthesized with the infrared thermal image. Step S306 is entered.

In step S306, the specified position and the specified dimension of the reference image located in the infrared thermal image are determined. In the embodiment, the position and the dimension of the reference image generated by the morphological constituted data acquired by the processing located in the infrared thermal image may be determined according to the default self-adaptive parameters (a self-adaptive area Z1 shown in the display interface G2103, the reference image centering).

In step S307, the thermal imaging data acquired by photographing is transmitted to the temporary storage part 4.

In step S308, the reference image is synthesized with the infrared thermal image. The control part 10 controls the image processing part 2 to perform corresponding processing for the morphological constituted data acquired by the cutting and acquire the image data of the reference image TU21 after the pseudo-color transformation according to the determined specified dimension, and to synthesize the image data of the reference image TU21 and the infrared thermal image generated by the thermal imaging data acquired by the photographing part 1 according to the specified position and the default transparency ratio to which the cutting corresponds.

In step S309, the synthesized image is displayed, as shown in the display interface G2103 in FIG. 21. Thus, the user can fully understand the purpose of the photographing assignment and requirements of quality, and the user can photograph the thermal image H21 of the photographed object according to the reference of the semitransparent image TU21.

In step S310, the control part 10 detects if a record instruction is received.

The user can understand the shape of the thermal image H21 of the photographed object and the imaging position, dimension, and angle in the infrared thermal image according to a visual reference of the semitransparent image TU21, and then adjust the photographing distance, angle, and imaging position between the optical part of the thermal imaging device 12 and the photographed object h21, to allow the thermal image H21 of the photographed object in FIG. 21 (the display interface G2104) to match the thermal image of the photographed object in the semitransparent image TU21. At this moment, the user sends the record instruction via the operation part, and step S311 is entered.

In step S311, related record between the infrared data and the constituted data of the reference image TU21 and the position information in the infrared thermal image is built.

The control part 10 as the recording part builds related record between the specified record information and the infrared data. In the embodiment, the specified record information is the constituted data of the reference image TU21 and the position information thereof in the infrared thermal image. Then, the reference record mode can be end, and return to the step S307 for recording again, In the embodiment, the cutting is performed for the determined processing object, and the morphological constituted data acquired by processing is determined as the constituted data related to the reference image synthesized with the infrared thermal image, thereby capable of acquiring the suitable reference image quickly and conveniently. The specified position and specified dimension of the reference image in the infrared thermal image are determined according to the self-adaptive area, thereby capable of making the position and dimension of the reference image normative quickly. Then, as the same type of the photographed objects are photographed on the same distance and similar angle via the reference image, the normalization of the record infrared thermal image can be ensured. The determined morphological constituted data is related record with the thermal imaging data, then different analyzed areas can be set according to the reference image TU21, and the related record infrared data document is batched and analyzed. In the embodiment, the advantages are performed as a representative embodiment of one system. However, the user may perform certain condition, such as directly responding to the operation to determine the acquired thermal imaging data as the morphological constituted data without cutting and being synthesized (or fused) semitransparently with the subsequent infrared thermal image. Any one product of the embodiment in the invention may not need to achieve all of the advantages at the same time.

In addition, the user may perform certain condition. For example, the related information of the morphological constituted data acquired by processing may be set and record, and then the photographing reference record mode is entered.

In the fourth embodiment, in the thermal imaging device 12 with the same structure of the first embodiment, the flash memory 7 stores control programs for performing related information set and record of the morphological constituted data. The control part 10, the operation part 9, and the display part 3 as an example of a related information setting part, are used for setting auxiliary constituted data (for acquiring the analyzed area, instruction mark information, or a combination thereof) corresponding to the morphological constituted data or setting information of the information of the photographed object. The control part 10 as an example of the setting record part is used for building related record between the morphological constituted data and the setting information.

For example, in step S303 in the third embodiment, the morphological constituted data acquired by the processing is acquired. At that moment, the subsequent reference record mode may not be performed temporarily, and setting of the related information, such as the analyzed area, the instruction mark, or the information of the photographed object, to which the morphological constituted data corresponds, may be first performed. In addition, the setting of the related information of the reference image displayed in the present synthesized image or the morphological constituted data read from the storage card 6 may be performed.

Figure 23:
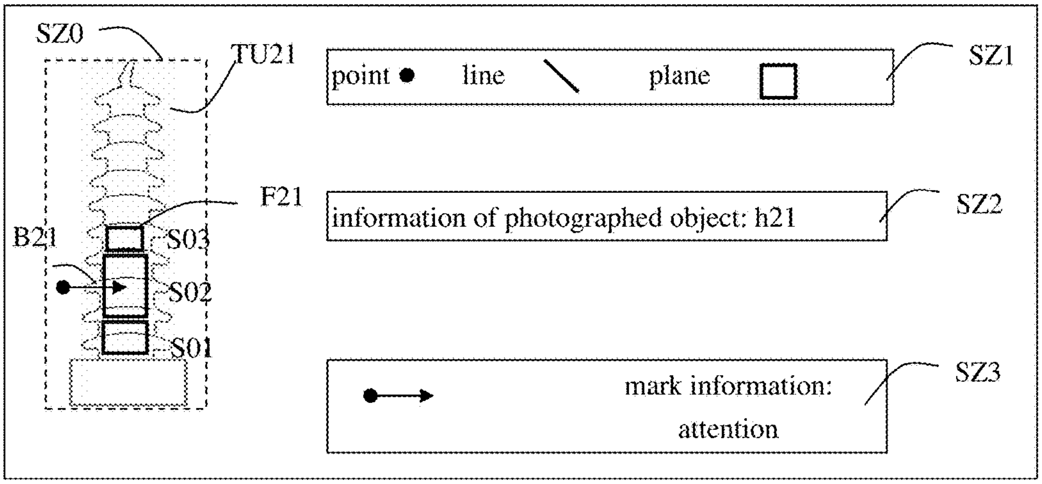
FIG. 23 is a schematic diagram showing a setting interface for setting related information of a reference image generated by morphological constituted data.

In detail, for responding the setting instruction, the control part 10 controls the display part 3 to display the setting interface as shown in FIG. 23. The users can set different information corresponding to the reference image TU21 generated by the morphological constituted data acquired by the processing. The setting interface includes an adjusting bar SZ0 displaying the reference image and adjusting the analyzed area, an analyzed area setting bar SZ1, a prompting mark setting bar SZ3, and an information inputting bar SZ2 of the photographed object.

The adjusting bar SZ0 is used for displaying the reference image TU21, the analyzed area F21 (including the analyzed area units S01, S02, S03), and a mark position. The users can amend the area units S01, S02, S03 in the analyzed area F21, such as deleting, changing positions, adjusting dimensions, changing (point, line, plane) types, such as changing S01, S02, S03 from rectangles to be circles, can set new area units, or adjust the mark position.

The analyzed area setting bar SZ1 is used for selecting a generating type of the analyzed area (including the analyzed area units) to which the reference image corresponds. "Point, line, plane" represents that the point, line, plane are set by the users in the reference image as the analyzed areas. The prompting mark setting bar SZ3 is used for setting prompting mark information, such as words, arrows, to instruct the part which needs attention. The words may be diagnostic criteria of the photographed object. In addition, according to the method in the fifth embodiment, the constituted data of the analyzed area may be set by processing or computing.

The information inputting bar SZ2 of the photographed object is used for inputting the information of the photographed object to which the reference image corresponds.

When the user finishes the setting determination, the control part 10 builds related record for the setting information of the reference image TU21. That is, the related information of the morphological constituted data of the reference image TU21, the constituted data of the analyzed area F21, the constituted data of the prompting mark B21, the position and dimension information of the analyzed area F21 in the reference image TU21, the position information of prompting mark B21 in the reference image TU21, and the information of the photographed object h21 is built and stored in the flash memory 7.

According to the above, in the embodiment, the auxiliary constituted data (for acquiring the analyzed area, the instruction mark information, or a combination thereof) corresponding to the morphological constituted data and the setting information of the information of the photographed object is set, and the related record of the morphological constituted data and the setting information is built, which is convenient for calling related data of the morphological constituted data later. Then, the reference record mode can be entered, or the operation of setting and related recording may also be repeated.

In the fifth embodiment, in the thermal imaging device 12 with the same structure of the first embodiment, the flash memory 7 further stores control programs for processing and/or computing the assigned object to acquire the constituted data. Further, when a main object is assigned in a plurality of objects with specified relative position relation, the position determining part first set the position parameter of the main object located in the infrared thermal image, and then set the position parameter of objects acquired by other constituted data located in the infrared thermal image. In the embodiment, regarding the reference image reflecting the specified morphological characters of the photographed object, the position parameter includes positions, dimensions, or rotating angles, and regarding to the objects acquired by the auxiliary constituted data, the position parameter includes positions, dimensions, or rotating angles, such as the positions when the analyzed area is a single point.

The photographing range area in the second embodiment may be considered as one condition of the main object. The reference range area to which the reference image corresponds represents the display reference range specified by the reference image, and the photographing range area can be considered as the main object. The main object can be directed to all objects with the specified relative position relation. In the embodiment, the flash memory 7 storing the information of the photographed object and the related constituted data in FIG. 18 is assumed.

Figure 24:
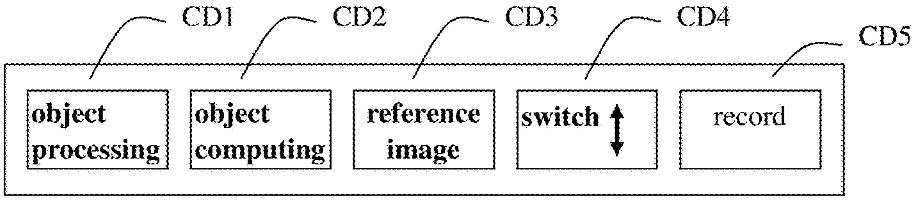
FIG. 24 is a schematic diagram showing a setting menu of a thermal imaging device in the fifth embodiment.

Referring to FIG. 24, another embodiment of the setting menu is described. When a user presses a menu key to enter a menu mode, the display part 3 displays the menu as shown in FIG. 24. When one menu item is selected, the corresponding configuration interface is displayed. The control part 10 and the operation part 9 are composed of the configuration part. The control part 10 responds the operation signal of the user, to perform corresponding display control and to record the configuration contents of the user in the storage medium. The related operation is performed by the operation part 9.

Referring to the configuration interface in FIG. 25, the menu item "object processing CD1" is described, and it is used for assigning a processing object and setting (increasing, amending, deleting) a processing rule by users.

The constituted data CD11 displays the information of the constituted data to be selected. The information of the constituted data to be selected may be type information of the morphological constituted data such as "contour", "texture" acquired from the table in FIG. 18. In addition, other type information such as the type information of the constituted data, to which the assigned processing object combined with the specified processing rule corresponds, may also be displayed as the type information to be selected.

The processing object CD12 is used for selecting the constituted data of the processing object by users. One or more constituted data may be selected to be the processing object, such as, capable of acquiring one or more morphological constituted data by processing.

The processing rule CD13 is used for setting the processing rule of the processing object by users. The processing rule includes algorithms and related parameters of the processing. When the enter key is pressed at length as the processing algorithm is selected, the parameter bar is displayed for inputting the parameter (not shown). The processing includes cutting, threshold range extracting, edge extracting, enhancement, filtering, pseudo-color, gray scale (multicolor to be gray scale, white and black), brightness adjusting, color adjusting, or a combination thereof. In addition, other different processing known well in the field may also be configured.

Referring to the configuration interface in FIG. 26, the menu item "object computing CD2" is described, and it is used for selecting a computing object and setting (increasing, amending, deleting) a computing rule by users The constituted data CD21 displays the information of the constituted data to be selected. The information of the constituted data to be selected may be type information such as "contour", "texture", or "analyzed area" acquired from FIG. 18 stored in the flash memory 7. In addition, other type information such as the type information of the constituted data, to which the assigned computing object combined with the specified computing rule corresponds, or the type information of the constituted data, to which the assigned processing object combined with the specified processing rule corresponds, may also be displayed as the type information to be selected.

The computing object CD22 is used for selecting a computing object by users. One or more constituted data may be selected as the computing object, such as capable of acquiring one or more constituted data by computing.

The computing rule CD23 is used for selecting and setting the computing rule of the computing object by users. The computing rule includes algorithms and related parameters. The algorithm may be scaling, warping, computing a feature point, computing a feature area, halving, computing a bounding rectangle, computing an inscribed rectangle, or computing a center line. The parameter may be a scaled base point and a scaling rate, a warped base point and a warping rate (such as an aspect ratio), a computing parameter of the feature point, a feature area type (such as point, line, plane) and dimension based on the feature point, a halving number, or related parameters of the algorithms. When the enter key is pressed at length as the algorithm is selected, the parameter bar is displayed for inputting the parameter (not shown). One or more computing rule may be selected for the selected computing object. The computing of the feature point may be computing a center point of the contour or computing a feature point (such as a highest temperature point) of the thermal imaging data.

In addition, the processing and/or computing object to be selected can be assigned from the displayed reference image, thermal image documents in the storage medium such as the storage card 6, the photographed thermal imaging data, or the infrared thermal image.

The configuration menus of "object processing CD1" and "object computing CD2" may also be combined to one configuration interface. One or more processing rule and/or one or more computing rule can be selected for the assigned object (such as the prestored constituted data in FIG. 18, the thermal image documents in the storage card 6, or the photographed thermal imaging data), and the processing and/or computing may be called handling for the assigned object. In addition, the related processing rule or computing rule may be configured, and the specified constituted data may not be assigned, such as default configuration suitable for subsequent selected constituted data.

Figure 27:
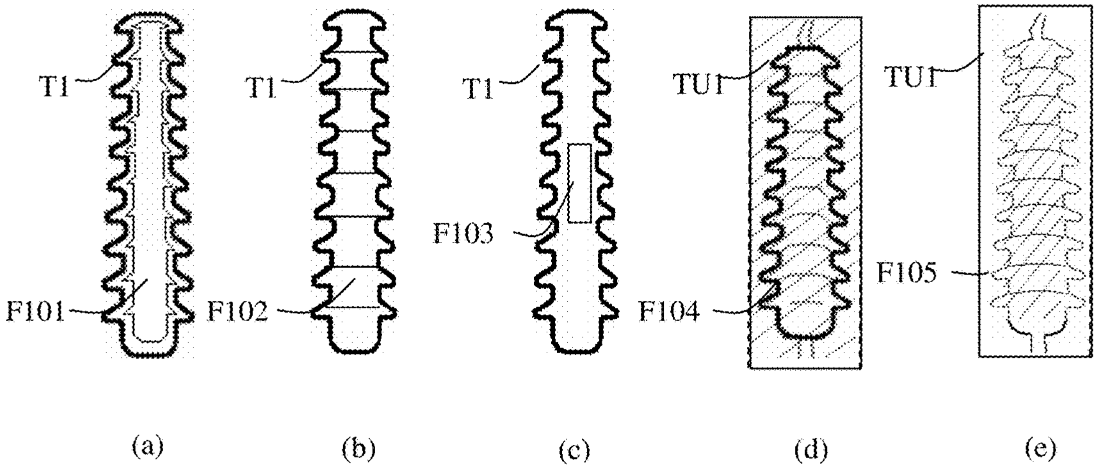
FIG. 27 includes five schematic diagrams showing reference images acquired by computing or processing.

Referring to FIG. 27, the function and effect of the reference image acquired by computing or processing are described.

Referring to the reference image in FIG. 27 (*a*), the constituted data of the contour image T1 is used as a computing object, and after scaling and warping is performed by using a center point of the contour image T1 as a base point, the image F101 is acquired. The reference image can be used for prompting the users to observe temperature distribution of a specified area on the main body of the photographed object, thereby reducing influence of surrounding environment to assessment.

Referring to the reference image in FIG. 27 (*b*), the constituted data of the contour image T1 is used as the computing object, the algorithm parameter is eight-equal part, and the eight-equal area F102 is acquired. The reference image can be used for prompting the users to observe temperature distribution of different parts of the main body of the photographed object.

Referring to the reference image in FIG. 27 (*c*), the constituted data of the contour image T1 is used as the computing object, the algorithm parameter is to compute based on a feature point (such as a center point), and the area F103 with a specified dimension based on the center point is set. The reference image can be used for prompting the users to observe the area.

Referring to the reference image in FIG. 27(*d*), the constituted data of the local infrared thermal image TU1 is used as the processing object, the processing rule may be edge contour extracting, and the edge contour image F104 is acquired, thereby improving the reference effect of the local infrared thermal image TU1.

Referring to the reference image in FIG. 27 (*e*), the constituted data of the local infrared thermal image TU1 is used as the processing object, the processing rule may be to extract pixel points (range extracting) above a specified temperature threshold, and the image F105 is acquired. In some condition, the reference effect of the image F105 for the main body of the photographed object is better than the effect of the local infrared thermal image TU1 as the reference image.

Referring to the configuration interface in FIG. 28, the configuration of "reference image CD3" is described.

The "reference image CD3" is used for setting the constituted data, position rules, and synthesized parameters related to the reference image in a non-switch state in the reference mode by the users.

The constituted data CD31 displays the information of the constituted data to be selected, such as the type information "contour", "texture", or "analyzed area" acquired from FIG. 18 stored in the flash memory 7. In addition, other type information such as the type information "contour (processing)" of the constituted data to which the assigned processing object combined with the specified processing rule corresponds and set in "object processing CD1", or the type information "contour (computing)" of the constituted data to which the assigned computing object combined with the specified computing rule corresponds and set in "object computing CD2", may also be displayed for selection.

The reference image CD32 is used for selecting the constituted data acquiring the reference image by the users. One or more constituted data can be selected to acquire the reference image. In the embodiment, the object acquired by each constituted data is used as a synthesized object. That is, when more constituted data is selected, the reference image includes a plurality of synthesized objects (also meaning that more constituted data acquires the reference image). The reference image CD32 may also be selected, and the enter key is pressed at length, thereby capable of determining part or all of the selected constituted data as one synthesized object (not shown).

Referring to FIG. 28, the determined constituted data is described. At least one constituted data or more constituted data may be selected from "contour", "texture", "analyzed area" stored in the flash memory 7, the morphological constituted data such as "contour (processing)" to which the specified processing object combined with the specified processing rule corresponds, and the auxiliary constituted data such as "contour (computing)" to which the constituted data of the specified computing object combined with the specified computing rule corresponds. The constituted data may be more morphological constituted data or may include the morphological constituted data and the auxiliary constituted data.

In addition, the thermal imaging data acquired by photographing may be selected as the constituted data, or the thermal imaging documents acquired from the storage card 6 may also be selected as the constituted data. Then, the constituted data stored in the storage medium (such as the flash memory 7, the storage card 6, or the temporary storage part 4) and the selected configuration may be used to determine the constituted data related with the reference image.

The position rule CD33 is used for configuring the position rule related with the position parameter of the reference image located in the infrared thermal image by users.

When the main object is assigned, the position determining part is used for setting the position parameter of the main object located in the infrared thermal image, and then the position parameter of other objects located in the infrared thermal image is automatically set through the specified relative position relation between the main object and other objects combined with the position parameter of the main object located in the infrared thermal image. For example, the main object with the specified relative position relation of the reference image may be first determined, and the position parameter of the main object located in the infrared thermal image may be set. Then, the position parameter of the reference image located in the infrared thermal image can be set according to the specified relative position relation between the reference image and the main object and the position parameter of the main object located in the infrared thermal image.

When the constituted data for acquiring the main object is not selected, the objects acquired by the constituted data selected in "reference image CD32" set the position parameters according to the respective position rule.

According to FIG. 28, the main object can be selected from the constituted data CD31, such as the reference image, one part of the reference image, or the main object acquired by other constituted data except the constituted data of the reference image. That is, the constituted data for acquiring the main object may be one or more of the constituted data of the object with the specified relative position relation, such as the morphological constituted data (such as "contour"), the constituted data related with the morphological constituted data (such as "analyzed area"), the constituted data to which the assigned computing object combined with the specified computing rule corresponds (such as "contour (computing)"), or the constituted data to which the assigned processing object combined with the specified processing rule corresponds (such as "contour (processing)"). When more of the constituted data is assigned to acquire the main object, the combined object acquired by the more of the constituted data may be used as the main object.

Usually, the set main object represents the area which needs key observation. By exchanging the main object, the exchange of the reference image in different display positions can be realized, thereby realizing different photographing aims. In addition, the users can further select the reference image (one or more of the synthesized objects) displayed on the display part 3 as the main object.

Self-adaption is used for selecting a position setting mode of the self-adaption and assigning a self-adaptive object (such as the main object when the main object is selected). The self-adaptive area is a specified area in the infrared thermal image. By selecting the self-adaptive area and pressing the enter key at length, the position, dimension, and rotating angle of the self-adaptive area located in the infrared thermal image can be set, and the position (capable of being used as a scaling base point of the self-adaption) and rotating angle of the self-adaptive object located in the self-adaptive area can be set. In the embodiment, 90% of a centering window area of the infrared thermal image can be used as the self-adaptive area, which is called Z1 for short, and the self-adaptive object is centered and self-adaptive in Z1.

The assigned position is used for assigning the position parameter of the reference image (such as the main object, when the main object is selected) acquired by the selected constituted data and located in the infrared thermal image. When the user selects the "assigned position" bar, an input bar (not shown) is displayed, and the user can input the position, dimension, and rotating angle of the object acquired by the selected constituted data and located in the infrared thermal image. When the above is not input, the position origin may be defaulted as a top-left corner of the infrared thermal image, the dimension is an original dimension, and the rotating angle is zero.

When the related position is selected, the position parameter of the object acquired by the constituted data and located in the infrared thermal image is acquired, according to the position information in advance related to the selected constituted data (such as the main object when the main object is selected).

The synthesized parameter CD34 is used for setting the synthesized parameter of the reference image acquired by the selected constituted data and the infrared thermal image. The synthesized parameter may be a transparency ratio, a color or a line-type (not shown) according to different types of the constituted data, a synthesized order when the reference image includes a plurality of synthesized objects, or the synthesized parameter related to the constituted data.

When more of the constituted data is determined, more of the constituted data may be used to acquire a synthesized object (as the reference image), and the position determining part can set the position and dimension of more of the constituted data in the background during synthesis and the position and dimension of the finally acquired reference image located in the infrared thermal image. A plurality of the synthesized objects (as the reference image). capable of acquiring by more of the constituted data may be synthesized with the infrared thermal image in turn according to the specified synthesized order and transparency ration, to acquire the synthesized image of the reference image and the infrared thermal image, thereby realizing the collective display. At that moment, the position determining part sets the positions and dimensions of the synthesized objects, respectively, located in the infrared thermal image.

The switch CD4 is used for setting configuration information related to the switch object when the switch key of the operation part is pressed in the reference mode such as the collective display state of the reference image and the infrared thermal image configured in "reference image CD3". Referring to the configuration interface in FIG. 29, the configuration of "switch CD4" is described. The configuration information of switch may be the type of the switched constituted data, the position rule of the object acquired by the switched constituted data, the synthesized parameter (such as an overlapping order, a transparency ratio, or a color), or an exchange thereof, to acquire the configuration with different using effects of the reference image in FIG. 28. In addition, the infrared thermal image can be used as the switch object, and others are similar to "reference image CD3", without detailed description. The arrow CD40 of the switch CD4 is used for setting (increasing, amending, deleting) the switch rule. For example, the next switch interface may be entered via the arrow CD40, to configure more configuration information of the switch object.

Referring to the configuration interface in FIG. 30, the configuration of "record setting CD5" is described, which is used for setting the specified record information related stored with the infrared data during recording by users. The specified record information may be the information of the photographed object, the constituted data, the index information (such as a document name or a number of the constituted data) of the constituted data, the position information (such as the specified position information when the record instruction is responded) of the object acquired by the constituted data, or a combination thereof. The record constituted data does not need to be the constituted data of the acquired reference image.

The specified record information is shown in FIG. 30 and may be at least one type of the following information.

1) the information representing the information of the photographed object 2) the constituted data of the reference image or the constituted data of the object having the specified relative position relation with the reference image The constituted data of the reference image may be "contour" and/or "analyzed area". The constituted data of the object having the specified relative position relation with the reference image may be the constituted data "texture" related to the constituted data of the reference image, the constituted data "contour (processing)" acquired from an assigned processing object under a specified processing rule, or the constituted data "contour (computing)" acquired from an assigned computing object under a specified computing rule.

3) the position information in the infrared thermal image of the reference image or the object having the specified relative position relation with the reference image 4) the identity information of the constituted data of the reference image or the constituted data of the object having the specified relative position relation with the reference image In the fifth embodiment, the photographing aim of the users is to detect the whole thermal field distribution (the whole part represented by the contour image T6) of the photographed object h6. If there is a questionable part, a key analyzed part (the area represented by the analyzed area F6) of the photographed object may be approached. To realize the detecting aim conveniently, the users perform configuration before and after switch of the reference image.

By "reference image CD3", the user set the configuration as shown in FIG. 28, the reference image includes "contour" and "analyzed area", the position rule is that the contour (main object) and the self-adaptive area Z1 are centered and self-adaptive, and the synthesized parameter is that the transparency ratio is one. The synthesized order of "contour" is one, the synthesized order of "analyzed area" is two, and the color may default to the personal attributive color.

By "switch CD4", the user set "switch one" as shown in FIG. 29, the reference image includes "contour", "analyzed area", the position rule is that the analyzed area (main object) and the self-adaptive area Z1 are centered and self-adaptive, and the synthesized parameter is that the transparency ratio is one. The synthesized order of "contour" is one, the synthesized order of "analyzed area" is two, and the color may default to the personal attributive color.

By "record setting CD5", the user set the "specified record information" as shown in FIG. 30. The specified record information may be the information of the photographed object, the contour constituted data and the position information of the contour, the constituted data and position information of the analyzed area. For the display state of the reference image in FIG. 28 and the switch state in FIG. 29, in the embodiment, when the position information of the reference image is changed, the corresponding record position information may also be different.

When the switch key is pressed, the collective display of "contour (main object), analyzed area" and the infrared thermal image is switched to the collective display of "contour, analyzed area (main object)" and the infrared thermal image. When the switch key is pressed again, the display state is returned to the collective display of "contour (main object), analyzed area" and the infrared thermal image. Different main objects are used, representing control modes with different concerned focuses.

In the embodiment, the constituted data stored in the flash memory 7 (as shown in FIG. 18) is used as an example of the reference image. According to the description of the menus in FIG. 24 to FIG. 30, the user can configure the reference image with different effects based on the constituted data stored in the flash memory 7 such as the assigned computing object combined with the computing rule or the assigned processing object combined with the processing rule. The reference image may also be configured based on the thermal imaging documents stored in the storage card 6, or based on the photographed thermal imaging data. As the difference of the constituted data of the reference image, the position rule, or the synthesized parameter, the reference image with different reference effects and applications may be acquired. The switch image with different applications and effects can be acquired by configuration of switch, and the specified record information with different uses can be acquired by configuration of record.

In addition, even when the information of the photographed object in FIG. 4 or FIG. 17 is only related to one of the morphological constituted data, the user can configure the related constituted data by "reference image CD3" or "switch CD4" (for example, the user may set the constituted data, to which the related morphological constituted data combined with the specified processing rule or computing rule corresponds, by "object processing CD1" and "object computing CD2") and configure the reference image with different effects. The related morphological constituted data and the specified determined type of the processed and/or computed constituted data can be configured, thereby for flexible use.

When the setting operation is finished, the enter key is pressed. The control part 10 allows the set configuration to be stored in the flash memory 7 (such as a configuration file), using as default configuration of the thermal imaging device 12 without setting every time when using, and then returns to the standby photographing state. Although the embodiment of the related configuration performed by the user is described, the invention is not limited thereto, and the following embodiments can be performed. That is, when the thermal imaging device 12 leaves the factory, the related configuration of the processing is configured, without any manual setting. Otherwise, the configuration is finished in an external computer, and the configuration document is loaded to the thermal imaging device 12 before photographing. Otherwise, the user performs configuration for part of the above described content. Thereby, the constituted data can be automatically determined according to the specified determined type (such as the type of the prestored constituted data, the type to which the processing object combined with the processing rule corresponds, or the type to which the computing object combined with the computing rule corresponds) of the constituted data, and the specified position, specified dimension, or rotating angle of the reference image located in the infrared thermal image are automatically determined according to the position rule of the reference image.

Figure 32:
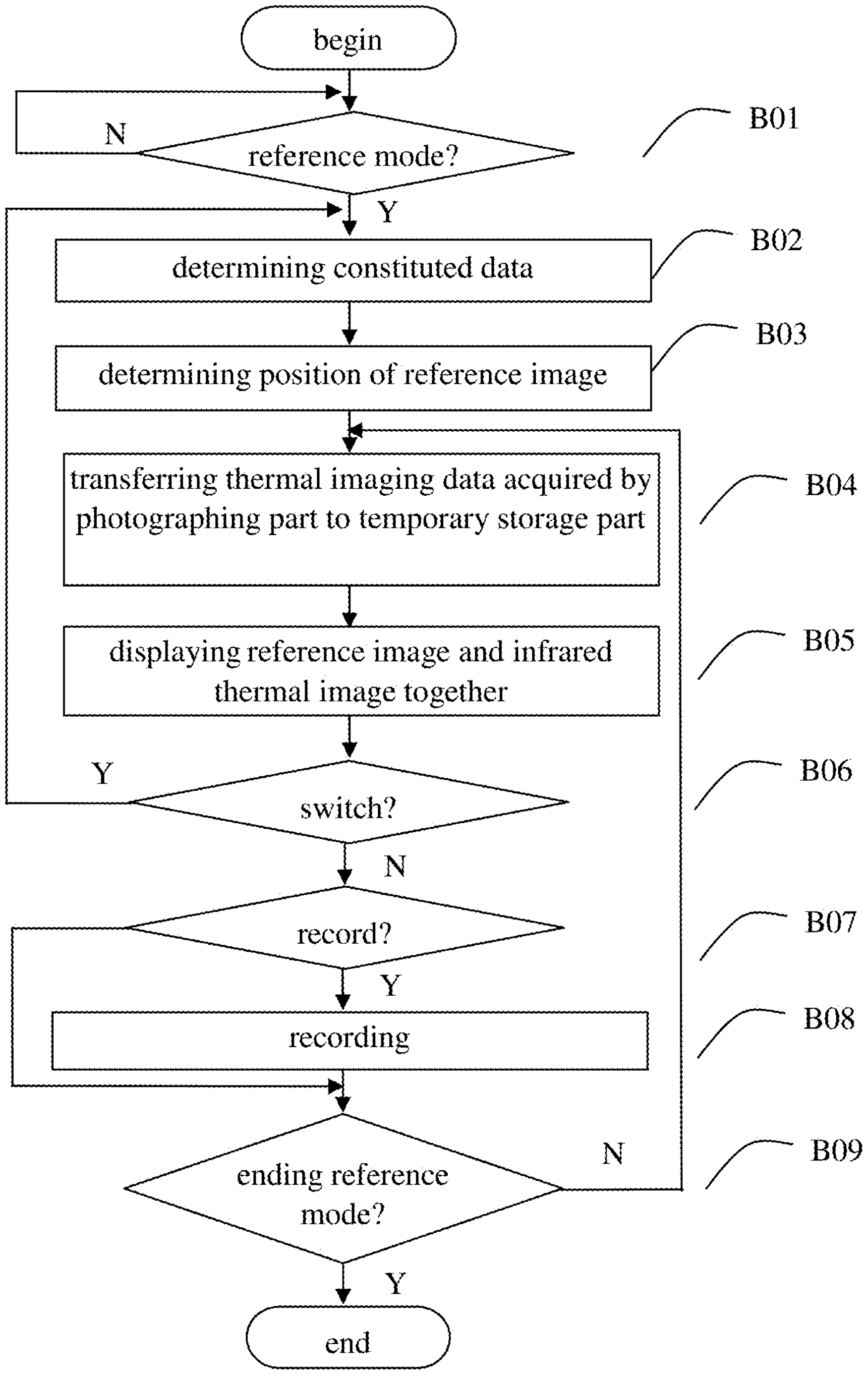
FIG. 32 is a flow chart showing a reference mode in the fifth embodiment.

Referring to FIG. 32, the flowchart in the fifth embodiment is described.

Figure 31:
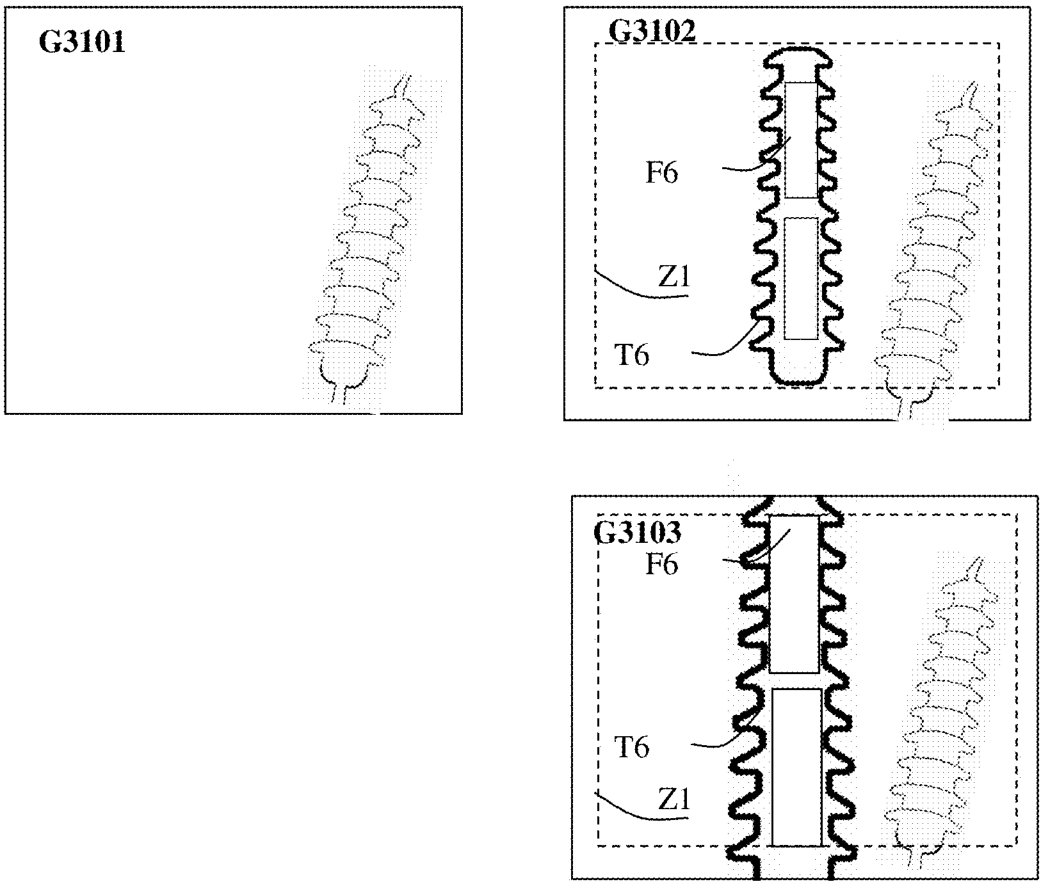
FIG. 31 is a schematic diagram showing a display interface of switch of the reference image in the fifth embodiment.

In step B01, the control part 10 continuously monitors if the user selects the reference mode as shown in G3101 in FIG. 31. When the user selects the reference mode by the operation part, the step B02 is entered.

In step B02, the control part 10 determines the constituted data. According to the configuration in FIG. 28, when the photographed object h6 is selected, the constituted data of the contour image T6 and the analyzed area F6 is used as the constituted data for acquiring the reference image.

In step B03, the position determining part determines the specified position and specified dimension of the reference image located in the infrared thermal image. According to the configuration in FIG. 28, the position parameters of the contour image T6 and analyzed area F6 located in the infrared thermal image and acquired by the constituted data of the contour image T6 and the constituted data of the analyzed area F6 may be computed, respectively. First, according to the "contour" type of the main object, the specified position and the specified dimension of the main object T6 in the infrared thermal image are computed. Then, according to the specified relative position relation of the analyzed area F6 and the contour image T6 and the position parameter of the contour image T6 in the infrared thermal image, the position and dimension of the analyzed area F6 in the infrared thermal image is determined, and the specified relative position relation remains the same.

However, there is the following application. According to the position parameter of the contour image T6 in the infrared thermal image, the position of the analyzed area F6 (auxiliary image) in the infrared thermal image is determined. The relative position of the analyzed area F6 and the contour image T6 remains the same, and the dimension of the analyzed area F6 can be the original dimension.

In step B04, the photographed thermal imaging data is transmitted to the temporary storage part 4.

In step B05, the reference image with the specified dimension acquired by the determined constituted data is displayed together with the continuous infrared thermal image generated by the thermal imaging data acquired by the photographing part according to the specified position. In one embodiment, the image processing part 2 synthesizes the image acquired by the constituted data of the selected T6 according to the specified dimension and the image acquired by the constituted data of the determined F6 according to the position parameter set by the position determining part with the infrared thermal image, respectively, in turn, according to the respective specified position. The synthesized image data is stored in the temporary storage part 4, and then the synthesized image is displayed at the display part 3.

In the embodiment, since the reference image includes the contour image T6 and the analyzed area F6, and the synthesized order is different, according to the synthesized order and transparency ratio of the respective object, the contour image T6 is first synthesized with the infrared thermal image according to the specified transparency ratio to acquire the medium data, and then the analyzed area F6 is synthesized with the medium data according to the specified transparency ratio to acquire the final synthesized image data.

Referring to the display interface G3102 in FIG. 31, the display of the contour image T6 is with that of the analyzed area F6. According to the reference of the contour image T6, the specified morphological characters of the thermal image of the photographed object are easy for understanding. According to the reference of the analyzed area F6, the prompting of the key observation part is easy to be obtained, thereby easily understanding the photographing aim.

In step B06, the control part 10 determines if the user performs switch operation. If the switch operation is performed, the switch processing is performed, that is, returning to the step B02. At that moment, according to the set switch configuration, the switched reference image or the infrared thermal image is determined.

When the user presses the switch key in the display state in FIG. 31 (G3102), according to the configuration in FIG. 29, the specified position and the specified dimension of the main object (the analyzed area F6) in the infrared thermal image are computed. Then, according to the specified relative position relation of the analyzed area F6 and the contour image T6 and the position parameter of the analyzed area F6 in the infrared thermal image, the position parameter of the contour image T6 in the infrared thermal image is determined. The display interface G3103 in FIG. 31 shows a display effect of setting the analyzed area F6 as the main object (self-adaption, self-adaptive area Z1, centering), reflecting the photographing aim that the area represented by the analyzed area F6 is main. Although part of the contour image T6 may overflow, the overflow is acceptable with suitable application need. Thus, the user approaches the photographed object for photographing with the reference of the reference image with the specified morphological characters, thereby assuring the photographing quality. If the user presses the switch key again, the display state G3102 is switched back.

In step B07, if the record key is pressed by the user is detected. If no, step B09 is entered. If yes, the next step is entered.

In step B08, recording is performed.

The recording part responds the record instruction of the operation part 9, allowing the specified record information to be related with the compressed thermal imaging data, to generate the thermal image document which is stored in the storage card 6, and the processing is end.

The position parameters to which the contour image T6 and the analyzed area F6 record in the state as shown in G3102 correspond, respectively, are different from the position parameters to which the contour image T6 and the analyzed area F6 record in the state as shown in G3103 correspond, respectively.

When the constituted data which needs to be record is generated (computed and/or processed), such as when the configured specified record information includes "contour (computing)" and the position information, the constituted data of the assigned reference image, that is, the constituted data of the contour image T6, may be computed to generate the constituted data which needs to be record, or the constituted data which needs to be record may be generated when recording. When the specified position and specified dimension of the reference image T6 located in the infrared thermal image are set, the position parameter of the object acquired by the constituted data "contour (computing)" located in the infrared thermal image may also be set and stored in the specified area of the temporary storage part 6, for the subsequent use, or the position parameter of the constituted data in the infrared thermal image may be set when recording. The record constituted data and the position parameter are not limited to the constituted data of the reference image.

In step B09, the control part 10 determines if the user withdraws from the reference mode.

If no, return to the step B04, reflecting the continuous synthesis and collective display of the contour image T6 and the analyzed area F6 and the continuous dynamic infrared thermal image. If there is an exit instruction, the reference mode is end.

In addition, in another embodiment, according to the specified relative position relation between the objects acquired by the constituted data (the morphological constituted data) of the contour image T6 and the constituted data (the auxiliary constituted data) of the analyzed area F6, one synthesized object is first synthesized, and then the specified position and the specified dimension of the synthesized object located in the infrared thermal image are set, without computing the specified position and the specified dimension of the respective acquired synthesized object in the infrared thermal image. Then, the synthesized object with the specified dimension is continuously synthesized with the infrared thermal image generated by the thermal imaging data acquired by the photographing part according to the specified position, to realize the collective display of the reference image and the infrared thermal image.

Further, to reflect effects of different main objects, in the embodiment, the reference images before and after switch are taken for example. The switch may not be performed. Further, in FIG. 31, the contour image T6 and the analyzed area F6 stored in the flash memory 7 as the main objects, respectively, for switching are taken for example. Other objects having the specified relative position relation with the reference image may also be used as the main object.

Figure 33:
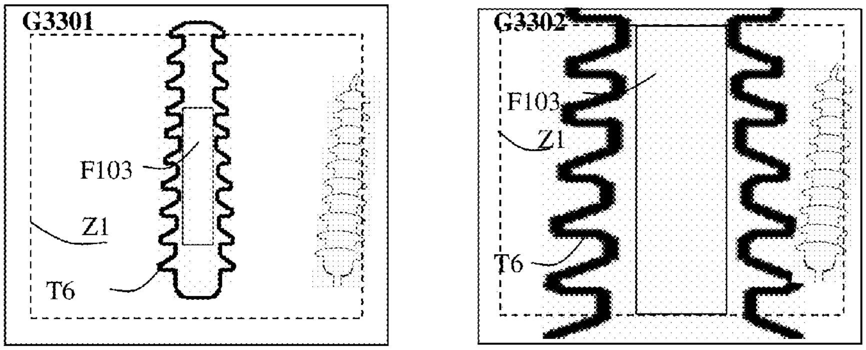
FIG. 33 is a schematic diagram showing a display interface of another switch of the reference image in the fifth embodiment.

In FIG. 33, assuming that the key observation part of the user is a middle part of the photographed object, the following configuration may be performed for the contour. That is, in FIG. 26 (the object computing CD2), the center point and the dimension of an expected key observation part are configured by using the contour image T6 as the computing object, to acquire the area F103. When the determined constituted data (more) includes the computing object combined with the computing algorithm, in one embodiment, the control part 10 controls the image processing part 2 to compute the computing object (the contour image T6) to acquire the area F103. The position determining part sets the position information of the reference image located in the infrared thermal image, based on the reference image acquired by the data acquired after the constituted data of the non-computing object in the determined constituted data and the computing object is computed. When the contour image T6 is used as the main object, such as the position parameter of the area F103 is determined according to the position parameter after the self-adaption of the contour image T6, G3301 in FIG. 33 is displayed. When the area F103 is used as the main object, according to the position parameter of the area F103 after self-adaption, the position parameter of the contour image T6 is determined, as shown in G3302 in FIG. 33 (the contour image T6 is shown in bold, or not). Thus, the user can configure the reference image flexibly according to the photographing aim. Further, the area F103 is not limited to be displayed, and it may also be used for recording. When the area is used as the analyzed area, the record is convenient for the subsequent batch processing.

The same is to the processing object combined with the processing rule. When the determined (more) constituted data includes the constituted data (as the main object) of non-processing object and the constituted data corresponding to the processing object combined with the processing rule, in one embodiment, the position determining part first determines the position parameter of the main object, and then determines the position parameter of the image generated by the constituted data acquired by processing according to the position parameter of the main object, thus to determine the position and dimension of the reference image located in the infrared thermal image, thereby acquiring the reference image.

According to the above, in the fifth embodiment, according to the reference of the reference image acquired by a plurality types of the constituted data, the key photographing part can be determined according to the photographing aim, further to improve the reference effect. To acquire the constituted data by processing and/or computing, the work load of preparing the constituted data such as the analyzed area in advance can be reduced, and the reference image conforming to the photographing aim or the analyzed area for subsequent batch processing is convenient to be configured. By exchanging the main object, the exchange in different display positions can be realized, thereby satisfying different photographing aims, and by configuration of the specified record information, the information needed by the subsequent batch processing is conveniently to be record. In the embodiment, convenient and flexible application modes are provided for improving the whole quality of photographing and recording. Although in the fifth embodiment the configuration (including processing and/or computing) of the constituted data related to the reference image, the specified determined type of the constituted data, the position setting of the reference image, the synthesized parameter of the reference image, switch of the reference image, and the configuration mode of the specified record information are described, the thermal imaging device 12 may not be set by users. And the elements can be configured when the thermal imaging device 12 leaves the factory. In use, according to the morphological constituted data in the storage medium, the configuration, determination, position setting, parameter displaying, switching of the constituted data of the reference image, and related record building of the specified record information can be automatically performed. Any product in the embodiment of the invention may not need to achieve all of the advantages at the same time.

Although in the first embodiment to the fifth embodiment, the thermal imaging device includes the photographing part, the thermal imaging data acquired by photographing is not necessary in the invention, and the thermal imaging device may receive and process the thermal imaging data (thermal image transmitting data) from external part. The thermal image transmitting data may be the thermal imaging data photographed by the thermal image photographing device connected with the thermal image processing device, the data such as the infrared thermal image acquired after the specified processing of the thermal imaging data, the compressed thermal imaging data, or the image data of the compressed infrared thermal image. In the sixth embodiment, the thermal image processing device 100 is taken as an example of the thermal imaging device.

Figure 34:
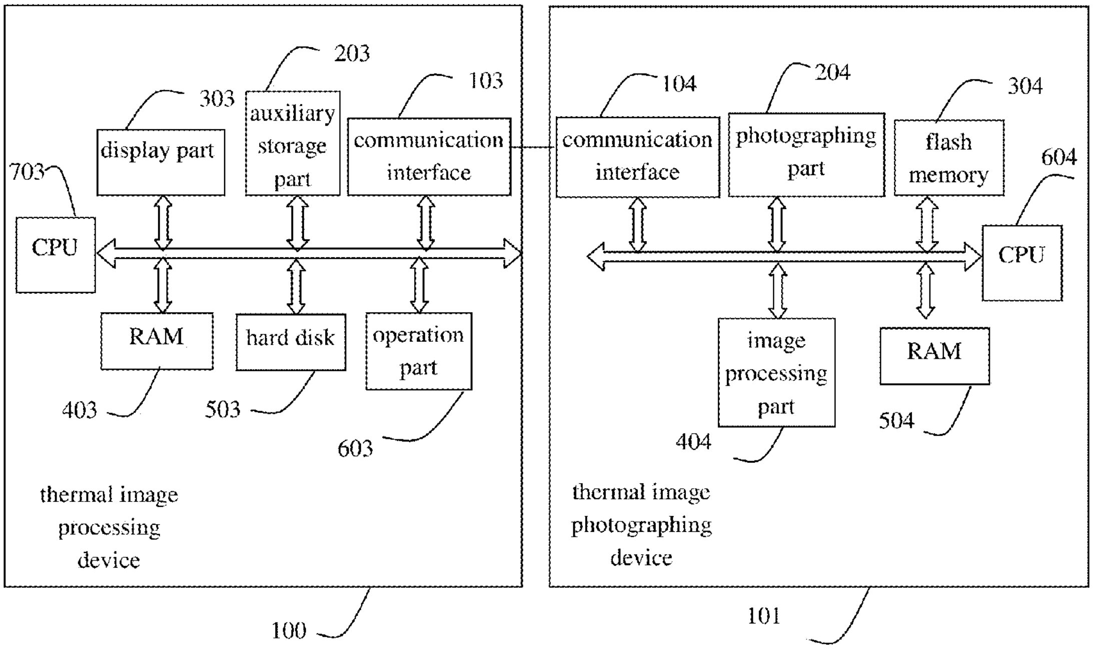
FIG. 34 is a block diagram showing a thermal image processing device connected with a thermal image photographing device in a sixth embodiment.

FIG. 34 is a frame diagram showing a thermal imaging system including a thermal image processing device 100 and a thermal image photographing device 101 connected with each other.

The thermal image processing device 100 includes a communication interface 103, an auxiliary storage part 203, a display part 303, a RAM 403, a hard disk 503, an operation part 603, and a CPU 703 connected with the above parts and for controlling the whole. The thermal image processing device 100 may be a personal computer, a personal digital assistant, or a display device cooperated with the thermal imaging device. The thermal image processing device 100 receives the thermal image transmitting data output from the thermal image photographing device 101 connected with the thermal image processing device 100 through the communication interface 103 based on the control of the CPU 703.

The communication interface 103 (an example of the acquiring part) is used for continuously receiving the thermal imaging data outputted from the thermal image photographing device 101, such as the thermal image transmitting data transmitted via a relay (the thermal imaging data outputted by the thermal image photographing device 101 is transmitted via the relay), and it may also be used as a communication interface for controlling the thermal image photographing device 101. In the embodiment, the communication interface 103 includes different kinds of wired or wireless communication interfaces of the thermal image processing device 100, such as a network interface, a USB interface, a 1394 interface, or a video interface.

The auxiliary storage part 203 may be a storage medium such as CD-ROM or storage card and a related interface.

The display part 303 may be a liquid display, the display part 303 may also be other displays connected with the thermal image processing device 100, and the thermal image processing device 100 may not include the display in its structure.

The RAM 403 is used as buffer storage for temporarily storing the thermal image transmitting data received by the communication interface 103, and is used as work storage of the CPU 703 for temporarily storing the data processed by the CPU 703.

The hard disk 503 stores control programs and different data used in control.

The operation part 603 is used for performing different operation such as instruction operation or setting information input by users. The CPU 703 executes related programs according to operation signals of the operation part 603.

The CPU 703 further performs functions of the image processing part, and is used for performing specified processing for the received thermal image transmitting data to acquire the image data of the infrared thermal image. The specified processing may be the processing for exchanging to be suitable for displaying or recording, such as amending, interpolation, pseudo-color, synthesis, compression, or decompression. According to the different forms of the thermal image transmitting data, when the thermal image transmitting data received by the CPU 703 is the compressed thermal imaging data, the specified processing may be compression and specified processing of the thermal image transmitting data received by the acquiring part performed by the CPU 703. In one embodiment, the corresponding specified processing may be pseudo-color processing after the thermal imaging data (thermal image transmitting data) is compressed, to acquire the image data of the infrared thermal image. In addition, the specified processing may be specified different processing such as correction or interpolation for the thermal image transmitting data after compression. In another embodiment, for example, when the received thermal image transmitting data is the image data of the compressed infrared thermal image, the image data of the infrared thermal image is acquired by compression. In another embodiment, for example, when the communication interface 1 receives the analog infrared thermal image, the image data of the digital infrared thermal image is acquired after AD conversion via related AD conversion circuits and is transmitted to the temporary storage part 403.

The structure of the thermal imaging device 12 except the photographing part 1 is similar with that of the thermal image processing device 100. The thermal image processing device 100 acquiring the thermal image transmitting data is also applied to the above embodiment. Therefore, the description of the embodiment is omitted.

The thermal image photographing device 101 may be different types of the thermal image photographing device and may be used for photographing the photographed object and outputting the thermal image transmitting data. In FIG. 34, the thermal image photographing device 101 includes a communication interface 104, a photographing part 204, a flash memory 304, an image processing part 404, a RAM 504, and a CPU 604. The CPU 604 controls the whole action of the thermal image photographing device 101, and the flash memory 304 stores control programs and data using in control of different parts. The photographing part 204 includes an optical part, a driving part, a thermal image sensor, and a signal preprocessing circuit, and is used for photographing to acquire the thermal imaging data. The thermal imaging data is temporarily stored in the RAM 50, and then is performed specified processing (such as compression) via the image processing part 404 (such as DSP) to acquire the thermal image transmitting data output via the communication interface 104. According to Difference of the design and using aim, for example, the thermal image photographing part 101 may output the thermal imaging data, the image data of the infrared thermal image, data after specified format compression of the thermal imaging data or the image data of the infrared thermal image, or a combination thereof, which is all called thermal image transmitting data. In the embodiment, the thermal image photographing device 101 is used for photographing and outputting the thermal image transmitting data, which has the function similar with the photographing part 1 of the thermal imaging device 12.

Figure 35:
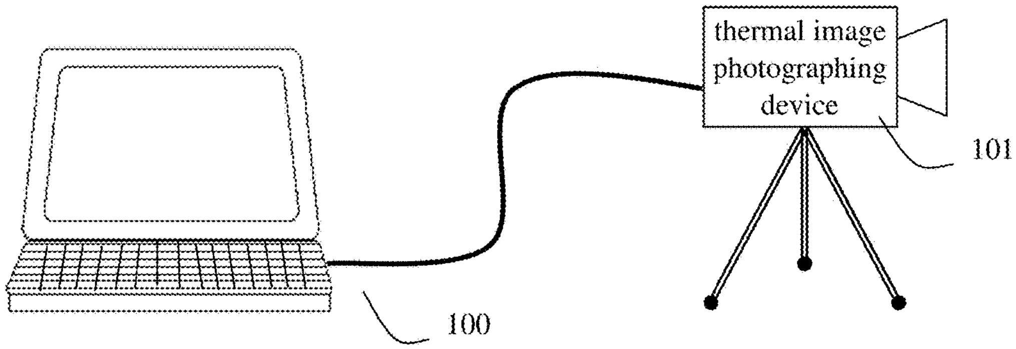
FIG. 35 is a schematic diagram showing the thermal image processing device connected with the thermal image photographing device in the sixth embodiment.

FIG. 35 is a schematic diagram showing a thermal image processing system including the connected thermal image processing device 100 and the thermal image photographing device 101 in one embodiment.

The thermal image photographing device 101 is connected with the thermal image processing device 100 via a tripod (or a holder to be disposed at a detection vehicle) in a mode with communication wires such as special cables or in a wired or wireless local area network. The users watch and monitor the thermal image of the photographed object via the thermal image processing device 100. The thermal image photographing device 101 is connected with the thermal image processing device 100 to form the thermal image processing system in the embodiment, used for photographing the photographed object to acquire the thermal imaging data and to output the thermal image transmitting data.

In the seventh embodiment, in the thermal imaging device 12 with the same structure in FIG. 1, the flash memory 7 stores the infrared thermal image for performing playback in the playback mode and control programs for setting the reference image and adjusting the reference image.

In one embodiment, in the playback mode, the thermal imaging data to be processed is selected (such as selecting the thermal image documents to be processed via the storage card 6. Then, the corresponding constituted data is determined to acquire the reference image, such as, determining if the thermal imaging data (frame) includes the related information of the constituted data of the reference image, such as constituted data related to the thermal imaging data, identity information of the constituted data, or information of the photographed object. If yes, the constituted data of the reference image is determined according to the related information, and if no, the document name, number, or thumbnail related to the identification of the constituted data for selection is displayed for the users to select. Then, the reference image and the infrared thermal image acquired by the thermal imaging data to be processed are displayed together (such as in G3601). At that moment, the user can check up the photographing quality. If the photographing quality is not better, such as, the visual matching degree of the thermal image of the photographed object in the infrared thermal image and the reference image is not better, the photographing may be performed again, thereby avoid mistakes in subsequent batch processing. Otherwise, the user may also adjust the reference image T151, to match the thermal image IR1 of the photographed object in the infrared thermal image. That is, according to the adjustment of the user, the position determining part correspondingly determines the position, dimension, and rotating angle of the reference image T151 located in the infrared thermal image, and reflects the adjusting effect on the display part. For example, when the visual matching effect in G3603 is achieved via the state in FIG. G3602, the subsequent processing is performed. For example, the relation of the position parameter of the reference image T151 and the thermal imaging data may be record, or the thermal imaging data is related record with at least one of a variation of a displacement, a scaling ratio, and a rotating angle of the reference image T151 after adjustment relative to that before adjustment, the position information of the reference image T151 located in the infrared thermal image after adjustment, or the position information of the object having the specified position relation with the reference image T151 located in the infrared thermal image after adjustment, thereby facilitating the subsequent batch processing. The analyzed area to which the reference image T151 corresponds may be called for analysis, thereby avoiding the trouble of setting the analyzed area and assuring accuracy of analysis.

The embodiment is not limited to the thermal imaging device with the photographing function, in the embodiment, the thermal image processing device (such as a computer, a personal digital assistant, a display device cooperated with the thermal imaging device with the photographing function) may be used as an example of the thermal imaging device, and is used for examination and assessment for the infrared data (such as the thermal image documents) during arrangement. In addition, to assess and exam the infrared thermal image during playback, when the reference image includes instruction of auxiliary objects such as the analyzed area, the user is convenient to assess.

When the thermal imaging data is assessed, analyzed, and arranged, via the operation such as display or adjustment of the reference image, the trouble of setting the analyzed area by the users can be reduced, and arrangement and adjustment before document batch of the thermal imaging data can be convenient, thereby assuring availability of batch and greatly reducing workload and technical requirements of the users.

In the above embodiment, the configuration for different processing by the users is described. When the configuration is finished, the set configuration stored in the flash memory 7 (such as a configuration file) is used as the default configuration of the thermal imaging device 12 without setting every time when using. However, the invention is not limited thereto. For example, when the thermal imaging device 12 leaves the factory, one or more of the settings may be configured, such as the embodiment of the specified determined type of the constituted data, the embodiment of the processing object and the specified processing rule, the embodiment of the computing object and the specified computing rule, the embodiment of the position setting processing, the embodiment of the synthesized parameter, and the embodiment of the specified record information. In use, according to the constituted data in the storage medium, the embodiment of the processing may be performed automatically according to the factory settings. Otherwise, part items may be configured when leaving the factory, and the users can configure the other parts.

In addition, in the embodiment, the determination of the constituted data of the reference image and the determination of the position of the reference image is described according to certain processing steps. However, the processing steps are not limited to the step order in the description and may have different processing orders. More embodiments may be obtained by differently combining the above processing.

Figure 36:
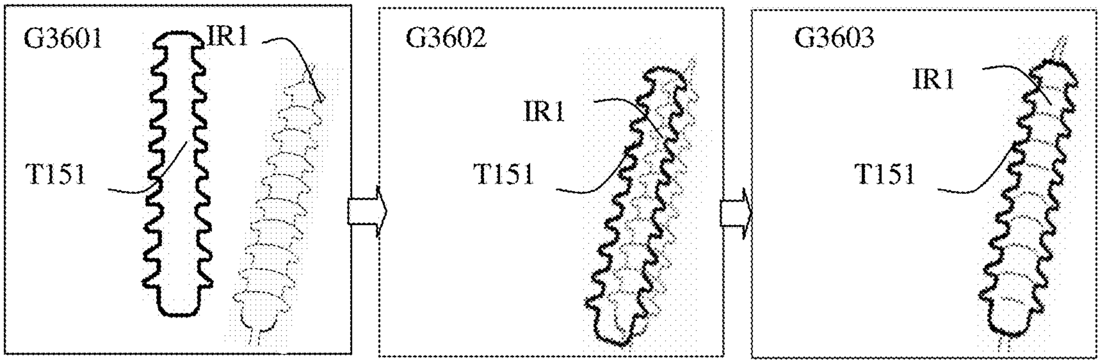
FIG. 36 is a schematic diagram of a display interface showing an adjusting process of a reference image according to a thermal image of a photographed object in a seventh embodiment.

In addition, in FIG. 19 (G1903), FIG. 21 (G2104), and FIG. 36 (G3603), the total matching visual effect of the reference image and the thermal image of the photographed object is reflected. In actual use, a margin of error is allowable.

In addition, in the above embodiment, the analyzed area is mainly used as an example of the auxiliary object or auxiliary constituted data. However, in the infrared detection field, the auxiliary constituted data is not limited to the constituted data of the analyzed area, and may be the constituted data of different auxiliary images related to reference photographing such as the attention area or the prompting area.

In the above embodiments, the working modes, such as the reference record mode, the processing mode, the related information setting mode, and the record mode, are described in a certain combination. However, the invention is not limited thereto. The working modes can be combined in different ways to acquire more embodiments.

In addition, in the embodiment, the electric power industry as the scene is taken for example, and different fields of the infrared detection are also applied.

In addition, in the first embodiment, the record thermal imaging data is stored in the storage card 6. However, the invention is not limited thereto. It may also be record to other devices communicated with the thermal imaging device wiredly or wirelessly, such as the storage medium as other thermal imaging devices or computers. The data may be transmitted via the communication I/F 8, such as the network destination as the communication I/F8.

In addition, private circuits, common processors, or programmable FPGA may be used to realize the processing and control functions of part or whole of the parts in the embodiment of the invention.

In addition, the embodiment of the invention may be the computer program, digital signals of the computer program record in a readable record medium of a computer, such as a hard disk or storage, or the program or digital signals record in the record medium.

In the embodiment of the invention, a program is provided, and the following steps are executed when the program is run.

An acquiring step is used for continuously acquiring thermal imaging data.

A reference image determining step is used for determining constituted data related to a reference image reflecting specified morphological characters of a photographed object, and the determined constituted data is used for acquiring the reference image reflecting the specified morphological characters of the photographed object.

A position determining step is used for determining a specified position and a specified dimension of the reference image located in an infrared thermal image.

A synthesizing step is used for continuously synthesizing the infrared thermal image and the reference image according to the specified position to acquire a synthesized image. The infrared thermal image is generated by the thermal imaging data continuously acquired in the acquiring step, and the reference image is acquired according to the specified dimension and the constituted data determined in the reference image determining step.

A recording step is used for recording infrared data, and the infrared data is the acquired thermal imaging data and/or data acquired after specified processing for the acquired thermal imaging data.

In the embodiment of the invention, a readable storage medium storing a computer program for exchanging electronic data is provided, and the computer program allows the computer in the thermal imaging device to execute the following steps.

An acquiring step is used for continuously acquiring thermal imaging data.

A reference image determining step is used for determining constituted data related to a reference image reflecting specified morphological characters of a photographed object, and the determined constituted data is used for acquiring the reference image reflecting the specified morphological characters of the photographed object.

A position determining step is used for determining a specified position and a specified dimension of the reference image located in an infrared thermal image.

A display controlling step is used for together displaying the reference image with the specified dimension acquired by the determined constituted data and the infrared thermal image generated by the continuously acquired thermal imaging data according to the specified position.

A recording step is used for recording infrared data, and the infrared data is the acquired thermal imaging data and/or data acquired after specified processing for the acquired thermal imaging data.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A thermal imaging device comprising:

an acquiring part for acquiring thermal imaging data;

a storage part for storing information of photographed objects;

a selecting part for selecting information of the photographed object prestored in the storage part according to a need at a photographing scene by a user;

a reference image determining part for determining constituted data related to a reference image reflecting specified morphological characters of a photographed object, the determined constituted data being used for acquiring the reference image reflecting the specified morphological characters of the photographed object; the reference image determining part for determining the constituted data for acquiring the reference image according to the selected information of the photographed object from the stored information of photographed objects in the storage part through the selecting part and the constituted data related to the information of the photographed object; the information of the photographed object being information representing identity of the photographed object comprising a type, a name, a number, a place of the photographed object, or a combination thereof;

a position determining part for determining a specified position and a specified dimension of the reference image located in an infrared thermal image;

a synthesizing part for synthesizing the infrared thermal image and the reference image to acquire a synthesized image according to the specified position, wherein the infrared thermal image is generated according to the thermal imaging data acquired by the acquiring part, and the reference image is acquired according to the specified dimension and the constituted data determined by the reference image determining part;

an analyzed area setting part for setting an analyzed area having a specified relative position relation with the reference image, the analyzed area setting part determining the constituted data of the analyzed area based on the constituted data related to the selected information of the photographed object according to the selected information of the photographed object;

a recording part for recording infrared data, the infrared data being the acquired thermal imaging data and/or data acquired after specified processing for the acquired thermal imaging data;

wherein the constituted data comprises morphological constituted data and auxiliary constituted data, the morphological constituted data is the constituted data representing images of the specified morphological characters of the photographed object, the auxiliary constituted data is the constituted data except the morphological constituted data, and the reference image may be acquired according to the morphological constituted data or the morphological constituted data and the auxiliary constituted data determined by the reference image determining part;

the morphological constituted data comprises constituted data of a contour image of the photographed object; and the auxiliary constituted data comprises the constituted data of the analyzed area;

wherein when a main object is assigned, the position determining part is used for setting a position parameter of the main object in the infrared thermal image, and then is used for automatically setting position parameters of other objects in the infrared thermal image according to the specified relative position relation between other objects and the main object combined with the position parameter of the main object in the infrared thermal image, and one of the main object and other objects may be the object acquired by the constituted data of the reference image or one kind of the constituted data of the reference image;

the thermal imaging device further comprises a switch controlling part for responding specified operation of a user, to perform switch controlling for the main object;

wherein the position determining part performs non-overflow maximization scaling with a fixed aspect ratio in a self-adaptive area to acquire a self-adaptive dimension according to a position and a dimension of the specified self-adaptive area in the infrared thermal image and the position of the reference image in the self-adaptive area, further to determine the specified position and the specified dimension of the reference image located in the infrared thermal image, wherein the self-adaptive area is a specified area for self-adaptively displaying the reference image in the infrared thermal image, and the self-adaptive display is the non-overflow maximization display with the fixed aspect ratio in the self-adaptive area by the reference image in the specified position of the self-adaptive area;

wherein ratios of X-axis and Y-axis between the self-adaptive area having a dimension X1, Y1 and the reference image having a dimension X2, Y2 before scaling is computed, and a smaller one of X1/X2 and Y1/Y2 is selected as a scaling ratio based on a center point of the reference image when the reference image is centered; and specified auxiliary constituted data, being data of point, line, and plane with the specified relative position relation of the reference image, is relatively stored with thermal imaging data during recording and processing;

according to the specified relative position relation between the objects acquired by the morphological constituted data and the auxiliary constituted data, one synthesized object is first synthesized, and then a specified position and a specified dimension of the synthesized object located in the infrared thermal image are set, without computing the specified position and the specified dimension of the respective acquired synthesized object in the infrared thermal image; the synthesized object with the specified dimension is continuously synthesized with the infrared thermal image generated by the thermal imaging data acquired according to the specified position, to realize a collective display of the reference image and the infrared thermal image.

2. The thermal imaging device according to claim 1, wherein the morphological constituted data comprises constituted data of a texture character of the photographed object; and the auxiliary constituted data comprises the constituted data of a prompting mark.

3. The thermal imaging device according to claim 1, wherein the synthesizing part is used for performing selective pseudo-color processing for the acquired thermal imaging data according to the specified position and the reference image with the specified dimension acquired by the determined constituted data, to acquire a synthesized image reflecting the reference image and the infrared thermal image generated by the thermal imaging data; the selective pseudo-color processing comprises:

taking the image data of the reference image in a pixel position as the image data of the synthesized image in a corresponding pixel position, the pseudo-color processing is not performed for the thermal imaging data in the corresponding pixel position, and the pseudo-color processing is performed for the thermal imaging data except the pixel position of the reference image;

the pseudo-color processing for the thermal imaging data of the pixel position of the thermal imaging data corresponding to the reference image is different from the pseudo-color processing for the thermal imaging data of other pixel positions; or the pseudo-color processing is performed after a specified value is taken away from the thermal imaging data of the pixel position in the thermal imaging data corresponding to the reference image.

4. The thermal imaging device according to claim 1, wherein the synthesizing part synthesizes the infrared thermal image and the reference image according to a specified transparency ratio to acquire the synthesized image, allowing the reference image to be semitransparent in the displayed synthesized image; and the transparency ratio represents a ratio of image data of the reference image and image data of the infrared thermal image during synthesis in a corresponding pixel of the synthesized image, a sum of the transparency ratio of the reference image and the infrared thermal image is one.

5. The thermal imaging device according to claim 1, further comprising a display controlling part for controlling a display part to display the synthesized image.

6. The thermal imaging device according to claim 5, wherein the acquiring part is used for continuously acquiring the thermal imaging data, the synthesizing part is used for continuously synthesizing the infrared thermal image and the reference image to acquire a synthesized image according to the specified position, the infrared thermal image is generated according to the thermal imaging data continuously acquired by the acquiring part, and the reference image is acquired according to the specified dimension and the constituted data determined by the reference image determining part.

7. The thermal imaging device according to claim 6, further comprising:

the storage part for storing the constituted data related to the information of each photographed object;

and the reference image determining part for determining the constituted data for acquiring the reference image according to the selected information of the photographed object and the constituted data related to the information of the photographed object, wherein the selecting part is used for selecting the information of the photographed object by selection of options of the information of the photographed object, as a specified number of the options of the information of the photographed object are displayed on a specified position of a display part, according to the information of the photographed object stored in the storage part.

8. The thermal imaging device according to claim 6, further comprising:

a processing object assigned part for assigning a processing object;

an image handling part for performing specified processing for the processing object to acquire the morphological constituted data;

the storage part for storing the morphological constituted data acquired by processing;

the reference image determining part for determining the morphological constituted data acquired by the image handling part and stored in the storage part as the constituted data related to the reference image.

9. The thermal imaging device according to claim 1, wherein the constituted data determined by the reference image determining part is the morphological constituted data prestored in the storage part, the morphological constituted data acquired from a processing object under a processing rule, a combination thereof, or a combination of the morphological constituted data and the auxiliary constituted prestored in the storage part or/and the auxiliary constituted data acquired from a computing object under a computing rule, the processing object may be the morphological constituted data stored in the storage part, the processing rule comprises one or more than one kind of processing for the processing object, the computing object may be the constituted data stored in the storage part, and the computing object may be selectively performed under one or more than one computing rule.

10. The thermal imaging device according to claim 8, wherein the processing at least is cutting, threshold range extracting, edge extracting, enhancement, filtering, pseudocolor processing, gray scale processing, brightness adjusting, color adjusting, scaling, rotating, or a combination thereof.

11. The thermal imaging device according to claim 9, wherein the processing at least is cutting, threshold range extracting, edge extracting, enhancement, filtering, pseudocolor processing, gray scale processing, brightness adjusting, color adjusting, scaling, rotating, or a combination thereof.

12. The thermal imaging device according to claim 9, wherein the computing rule at least is scaling, warping, computing a feature point, computing a feature area, halving, computing a bounding rectangle, computing an inscribed rectangle, computing a center line for the computing object, or a combination thereof.

13. A thermal imaging device comprising:

an acquiring part for acquiring thermal imaging data;

a storage part for storing information of photographed objects;

a selecting part for selecting information of the photographed object prestored in the storage part according to a need at a photographing scene by a user;

a reference image determining part for determining constituted data related to a reference image reflecting specified morphological characters of a photographed object, the determined constituted data being used for acquiring the reference image reflecting the specified morphological characters of the photographed object; the reference image determining part for determining the constituted data for acquiring the reference image according to the selected information of the photographed object from the stored information of photographed objects in the storage part through the selecting part and the constituted data related to the information of the photographed object; the information of the photographed object being information representing identity of the photographed object comprising a type, a name, a number, a place of the photographed object, or a combination thereof;

a position determining part for determining a specified position and a specified dimension of the reference image located in an infrared thermal image;

a display controlling part for together displaying the reference image with the specified dimension acquired by the determined constituted data and the infrared thermal image generated by the acquired thermal imaging data according to the specified position;

an analyzed area setting part for setting an analyzed area having a specified relative position relation with the reference image, the analyzed area setting part determining the constituted data of the analyzed area based on the constituted data related to the selected information of the photographed object according to the selected information of the photographed object;

a recording part for recording infrared data, the infrared data being the acquired thermal imaging data and/or data acquired after specified processing for the acquired thermal imaging data;

wherein the constituted data comprises morphological constituted data and auxiliary constituted data, the morphological constituted data is the constituted data representing images of the specified morphological characters of the photographed object, the auxiliary constituted data is the constituted data except the morphological constituted data, and the reference image may be acquired according to the morphological constituted data or the morphological constituted data and the auxiliary constituted data determined by the reference image determining part;

the morphological constituted data comprises constituted data of a contour image of the photographed object; and the auxiliary constituted data comprises the constituted data of the analyzed area;

wherein when a main object is assigned, the position determining part is used for setting a position parameter of the main object in the infrared thermal image, and then is used for automatically setting position parameters of other objects in the infrared thermal image according to the specified relative position relation between other objects and the main object combined with the position parameter of the main object in the infrared thermal image, and one of the main object and other objects may be the object acquired by the constituted data of the reference image or one kind of the constituted data of the reference image;

the thermal imaging device further comprises a switch controlling part for responding specified operation of a user, to perform switch controlling for the main object;

wherein the position determining part performs non-overflow maximization scaling with a fixed aspect ratio in a self-adaptive area to acquire a self-adaptive dimension according to a position and a dimension of the specified self-adaptive area in the infrared thermal image and the position of the reference image in the self-adaptive area, further to determine the specified position and the specified dimension of the reference image located in the infrared thermal image, wherein the self-adaptive area is a specified area for self-adaptively displaying the reference image in the infrared thermal image, and the self-adaptive display is the non-overflow maximization display with the fixed aspect ratio in the self-adaptive area by the reference image in the specified position of the self-adaptive area;

wherein ratios of X-axis and Y-axis between the self-adaptive area having a dimension X1, Y1 and the reference image having a dimension X2, Y2 before scaling is computed, and a smaller one of X1/X2 and Y1/Y2 is selected as a scaling ratio based on a center point of the reference image when the reference image is centered; and specified auxiliary constituted data, being data of point, line, and plane with the specified relative position relation of the reference image, is relatively stored with thermal imaging data during recording and processing;

according to the specified relative position relation between the objects acquired by the morphological constituted data and the auxiliary constituted data, one synthesized object is first synthesized, and then a specified position and a specified dimension of the synthesized object located in the infrared thermal image are set, without computing the specified position and the specified dimension of the respective acquired synthesized object in the infrared thermal image; the synthesized object with the specified dimension is continuously synthesized with the infrared thermal image generated by the thermal imaging data acquired according to the specified position, to realize a collective display of the reference image and the infrared thermal image.

14. The thermal imaging device according to claim 13, wherein the acquiring part is used for continuously acquiring the thermal imaging data, and the display controlling part is used for together displaying the reference image with the specified dimension acquired by the determined constituted data and the infrared thermal image generated by the continuously acquired thermal imaging data according to the specified position.

15. The thermal imaging device according to claim 6, wherein the acquiring part is a photographing part acquiring the thermal imaging data by photographing.

16. The thermal imaging device according to claim 15, wherein the thermal imaging device is a portable thermal imaging device.

17. The thermal imaging device according to claim 1, wherein the recording part responds operation of users to record the infrared data.

18. The thermal imaging device according to claim 6, wherein the recording part responds operation of users to record the infrared data.

19. The thermal imaging device according to claim 6, further comprising:

the storage part for storing the constituted data and related position information, the position information representing a specified position and a specified dimension of an image acquired from the constituted data to be located in the infrared thermal image;

the position determining part for determining the specified position and the specified dimension represented by the position information as the specified position and the specified dimension of the image acquired from the constituted data to be located in the infrared thermal image.

20. The thermal imaging device according to claim 1, wherein the reference image comprises an image representing an analyzed area and/or a prompting mark.

21. The thermal imaging device according to claim 6, wherein the reference image comprises an image representing an analyzed area and/or a prompting mark.

22. The thermal imaging device according to claim 6, further comprising a configuration part, for configuring at least one of the constituted data related to the reference image, a processing rule, a computing rule, a position rule, a synthesized parameter, and a switching rule by a user.

23. The thermal imaging device according to claim 6, further comprising a related information setting part and a setting record part, the related information setting part being used for setting the auxiliary constituted data to which the morphological constituted data corresponds and at least one kind of related information in information of the photographed object, and the setting record part being used for building a related record between the morphological constituted data and the related information set by the related information setting part.

24. The thermal imaging device according to claim 6, wherein the position determining part is used for determining the specified position, the specified dimension, and a rotating angle of the reference image located in the infrared thermal image, the synthesizing part is used for continuously synthesizing the infrared thermal image and the reference image to acquire the synthesized image according to the specified position, and the reference image is acquired according to the specified dimension, the rotating angle, and the constituted data determined by the reference image determining part.

25. The thermal imaging device according to claim 1, wherein the reference image reflects the morphological characters of the contour of the photographed object.

26. The thermal imaging device according to claim 1, wherein the position determining part is used for responding specified operation to change a position, a dimension, a rotating angle of the reference image located in the infrared thermal image, or a combination thereof, and the recording part is used for recording the infrared data related with at least one of a variation of a displacement, a scaling ratio, and a rotating angle of the reference image after adjustment relative to that before adjustment, position information of the reference image located in the infrared thermal image after adjustment, or position information of an object having specified position relation with the reference image located in the infrared thermal image after adjustment.

27. The thermal imaging device according to claim 5, wherein the position determining part is used for responding specified operation to change a position, a dimension, a rotating angle of the reference image located in the infrared thermal image, or a combination thereof, and the recording part is used for recording the infrared data related with at least one of a variation of a displacement, a scaling ratio, and a rotating angle of the reference image after adjustment relative to that before adjustment, position information of the reference image located in the infrared thermal image after adjustment, or position information of an object having specified position relation with the reference image located in the infrared thermal image after adjustment.

28. The thermal imaging device according to claim 6, wherein the position determining part is used for responding specified operation to change a position, a dimension, a rotating angle of the reference image located in the infrared thermal image, or a combination thereof, and the recording part is used for recording the infrared data related with at least one of a variation of a displacement, a scaling ratio, and a rotating angle of the reference image after adjustment relative to that before adjustment, position information of the reference image located in the infrared thermal image after adjustment, or position information of an object having specified position relation with the reference image located in the infrared thermal image after adjustment.

29. The thermal imaging device according to claim 1, wherein the recording part is used for building related record between specified record information and the infrared data, and the specified record information includes at least one type of the following information:

1) information representing the information of the photographed object,
2) the constituted data of the reference image or constituted data of an object having specified relative position relation with the reference image,
3) position information in the infrared thermal image of the reference image or the object having the specified relative position relation with the reference image,
4) identity information of the constituted data of the reference image or identity information of the constituted data of the object having the specified relative position relation with the reference image.

30. The thermal imaging device according to claim 5, wherein the recording part is used for building related record between specified record information and the infrared data, and the specified record information includes at least one type of the following information:

1) information representing the information of the photographed object,
2) the constituted data of the reference image or constituted data of an object having specified relative position relation with the reference image,
3) position information in the infrared thermal image of the reference image or the object having the specified relative position relation with the reference image,
4) identity information of the constituted data of the reference image or identity information of the constituted data of the object having the specified relative position relation with the reference image.

31. The thermal imaging device according to claim 6, wherein the recording part is used for building related record between specified record information and the infrared data, and the specified record information includes at least one type of the following information:

1) information representing the information of the photographed object,
2) the constituted data of the reference image or constituted data of an object having specified relative position relation with the reference image,
3) position information in the infrared thermal image of the reference image or the object having the specified relative position relation with the reference image,
4) identity information of the constituted data of the reference image or identity information of the constituted data of the object having the specified relative position relation with the reference image.

32. The thermal imaging device according to claim 7, wherein the recording part is used for building related record between specified record information and the infrared data, and the specified record information includes at least one type of the following information:

1) information representing the information of the photographed object,
2) the constituted data of the reference image or constituted data of an object having specified relative position relation with the reference image,
3) position information in the infrared thermal image of the reference image or the object having the specified relative position relation with the reference image,
4) identity information of the constituted data of the reference image or identity information of the constituted data of the object having the specified relative position relation with the reference image.

33. The thermal imaging device according to claim 13, wherein the recording part is used for building related record between specified record information and the infrared data, and the specified record information includes at least one type of the following information:

1) information representing the information of the photographed object,
2) the constituted data of the reference image or constituted data of an object having specified relative position relation with the reference image,
3) position information in the infrared thermal image of the reference image or the object having the specified relative position relation with the reference image,
4) identity information of the constituted data of the reference image or identity information of the constituted data of the object having the specified relative position relation with the reference image.

34. The thermal imaging device according to claim 14, wherein the recording part is used for building related record between specified record information and the infrared data, and the specified record information includes at least one type of the following information:

1) information representing the information of the photographed object,
2) the constituted data of the reference image or constituted data of an object having specified relative position relation with the reference image,
3) position information in the infrared thermal image of the reference image or the object having the specified relative position relation with the reference image,
4) identity information of the constituted data of the reference image or identity information of the constituted data of the object having the specified relative position relation with the reference image.

35. The thermal imaging device according to claim 15, wherein the recording part is used for building related record between specified record information and the infrared data, and the specified record information includes at least one type of the following information:

1) information representing the information of the photographed object,
2) the constituted data of the reference image or constituted data of an object having specified relative position relation with the reference image,
3) position information in the infrared thermal image of the reference image or the object having the specified relative position relation with the reference image,
4) identity information of the constituted data of the reference image or identity information of the constituted data of the object having the specified relative position relation with the reference image.

36. The thermal imaging device according to claim 16, wherein the recording part is used for building related record between specified record information and the infrared data, and the specified record information includes at least one type of the following information:

1) information representing the information of the photographed object,
2) the constituted data of the reference image or constituted data of an object having specified relative position relation with the reference image,
3) position information in the infrared thermal image of the reference image or the object having the specified relative position relation with the reference image,
4) identity information of the constituted data of the reference image or identity information of the constituted data of the object having the specified relative position relation with the reference image.

37. The thermal imaging device according to claim 17, wherein the recording part is used for building related record between specified record information and the infrared data, and the specified record information includes at least one type of the following information:

1) information representing the information of the photographed object,
2) the constituted data of the reference image or constituted data of an object having specified relative position relation with the reference image,
3) position information in the infrared thermal image of the reference image or the object having the specified relative position relation with the reference image,
4) identity information of the constituted data of the reference image or identity information of the constituted data of the object having the specified relative position relation with the reference image.

38. The thermal imaging device according to claim 18, wherein the recording part is used for building related record between specified record information and the infrared data, and the specified record information includes at least one type of the following information:

1) information representing the information of the photographed object,
2) the constituted data of the reference image or constituted data of an object having specified relative position relation with the reference image,
3) position information in the infrared thermal image of the reference image or the object having the specified relative position relation with the reference image,
4) identity information of the constituted data of the reference image or identity information of the constituted data of the object having the specified relative position relation with the reference image.

39. A normative photographing method for a thermal image comprising:

an acquiring step for acquiring thermal imaging data;

a storage step for storing information of photographed objects;

a selecting step for selecting information of the photographed object prestored in the storage step according to a need at a photographing scene by a user;

a reference image determining step for determining constituted data related to a reference image reflecting specified morphological characters of a photographed object, the determined constituted data being used for acquiring the reference image reflecting the specified morphological characters of the photographed object; the reference image determining step for determining the constituted data for acquiring the reference image according to the selected information of the photographed object from the stored information of photographed objects in the storage step through the selecting step and the constituted data related to the information of the photographed object; the information of the photographed object being information representing identity of the photographed object comprising a type, a name, a number, a place of the photographed object, or a combination thereof;

a position determining step for determining a specified position and a specified dimension of the reference image located in an infrared thermal image;

a synthesizing step for synthesizing the infrared thermal image and the reference image according to the specified position to acquire a synthesized image, the infrared thermal image being generated according to the thermal imaging data acquired in the acquiring step, the reference image being acquired according to the specified dimension and the constituted data determined in the reference image determining step;

an analyzed area setting step for setting an analyzed area having a specified relative position relation with the reference image, the analyzed area setting part determining the constituted data of the analyzed area based on the constituted data related to the selected information of the photographed object according to the selected information of the photographed object;

a recording step for recording infrared data, the infrared data being acquired thermal imaging data and/or data acquired after specified processing for the acquired thermal imaging data;

wherein the constituted data comprises morphological constituted data and auxiliary constituted data, the morphological constituted data is the constituted data representing images of the specified morphological characters of the photographed object, the auxiliary constituted data is the constituted data except the morphological constituted data, and the reference image may be acquired according to the morphological constituted data or the morphological constituted data and the auxiliary constituted data determined by the reference image determining step;

the morphological constituted data comprises constituted data of a contour image of the photographed object; and the auxiliary constituted data comprises the constituted data of the analyzed area;

wherein when a main object is assigned, the position determining step is used for setting a position parameter of the main object in the infrared thermal image, and then is used for automatically setting position parameters of other objects in the infrared thermal image according to the specified relative position relation between other objects and the main object combined with the position parameter of the main object in the infrared thermal image, and one of the main object and other objects may be the object acquired by the constituted data of the reference image or one kind of the constituted data of the reference image;

the normative photographing method further comprises a switch controlling step for responding specified operation of a user, to perform switch controlling for the main object;

wherein the position determining step performs non-overflow maximization scaling with a fixed aspect ratio in a self-adaptive area to acquire a self-adaptive dimension according to a position and a dimension of the specified self-adaptive area in the infrared thermal image and the position of the reference image in the self-adaptive area, further to determine the specified position and the specified dimension of the reference image located in the infrared thermal image, wherein the self-adaptive area is a specified area for self-adaptively displaying the reference image in the infrared thermal image, and the self-adaptive display is the non-overflow maximization display with the fixed aspect ratio in the self-adaptive area by the reference image in the specified position of the self-adaptive area;

wherein ratios of X-axis and Y-axis between the self-adaptive area having a dimension X1, Y1 and the reference image having a dimension X2, Y2 before scaling is computed, and a smaller one of X1/X2 and Y1/Y2 is selected as a scaling ratio based on a center point of the reference image when the reference image is centered; and specified auxiliary constituted data, being data of point, line, and plane with the specified relative position relation of the reference image, is relatively stored with thermal imaging data during recording and processing;

according to the specified relative position relation between the objects acquired by the morphological constituted data and the auxiliary constituted data, one synthesized object is first synthesized, and then a specified position and a specified dimension of the synthesized object located in the infrared thermal image are set, without computing the specified position and the specified dimension of the respective acquired synthesized object in the infrared thermal image; the synthesized object with the specified dimension is continuously synthesized with the infrared thermal image generated by the thermal imaging data acquired according to the specified position, to realize a collective display of the reference image and the infrared thermal image.

40. The normative photographing method for a thermal image according to claim 39, further comprising a display controlling step for controlling a display part to display the synthesized image.

41. The normative photographing method for a thermal image according to claim 40, wherein the acquiring step is used for continuously acquiring the thermal imaging data, the synthesizing step is used for continuously synthesizing the infrared thermal image and the reference image according to the specified position to acquire a synthesized image, and the infrared thermal image is generated according to the thermal imaging data continuously acquired in the acquiring step.

42. A normative photographing method for a thermal image comprising:

an acquiring step for acquiring thermal imaging data;

a storage step for storing information of photographed objects;

a selecting step for selecting information of the photographed object prestored in the storage step according to a need at a photographing scene by a user;

a reference image determining step for determining constituted data related to a reference image reflecting specified morphological characters of a photographed object, the determined constituted data being used for acquiring the reference image reflecting the specified morphological characters of the photographed object; the reference image determining step for determining the constituted data for acquiring the reference image according to the selected information of the photographed object from the stored information of photographed objects in the storage step through the selecting step and the constituted data related to the information of the photographed object; the information of the photographed object being information representing identity of the photographed object comprising a type, a name, a number, a place of the photographed object, or a combination thereof;

a position determining step for determining a specified position and a specified dimension of the reference image located in an infrared thermal image;

a display controlling step for together displaying the reference image with the specified dimension acquired by the determined constituted data and the infrared thermal image generated by the acquired thermal imaging data according to the specified position;

an analyzed area setting step for setting an analyzed area having a specified relative position relation with the reference image, the analyzed area setting part determining the constituted data of the analyzed area based on the constituted data related to the selected information of the photographed object according to the selected information of the photographed object;

a recording step for recording infrared data, the infrared data being the acquired thermal imaging data and/or data acquired after specified processing for the acquired thermal imaging data;

wherein the constituted data comprises morphological constituted data and auxiliary constituted data, the morphological constituted data is the constituted data representing images of the specified morphological characters of the photographed object, the auxiliary constituted data is the constituted data except the morphological constituted data, and the reference image may be acquired according to the morphological constituted data or the morphological constituted data and the auxiliary constituted data determined by the reference image determining step;

the morphological constituted data comprises constituted data of a contour image of the photographed object; and the auxiliary constituted data comprises the constituted data of the analyzed area;

wherein when a main object is assigned, the position determining step is used for setting a position parameter of the main object in the infrared thermal image, and then is used for automatically setting position parameters of other objects in the infrared thermal image according to the specified relative position relation between other objects and the main object combined with the position parameter of the main object in the infrared thermal image, and one of the main object and other objects may be the object acquired by the constituted data of the reference image or one kind of the constituted data of the reference image;

the normative photographing method further comprises a switch controlling step for responding specified operation of a user, to perform switch controlling for the main object;

wherein the position determining step performs non-overflow maximization scaling with a fixed aspect ratio in a self-adaptive area to acquire a self-adaptive dimension according to a position and a dimension of the specified self-adaptive area in the infrared thermal image and the position of the reference image in the self-adaptive area, further to determine the specified position and the specified dimension of the reference image located in the infrared thermal image, wherein the self-adaptive area is a specified area for self-adaptively displaying the reference image in the infrared thermal image, and the self-adaptive display is the non-overflow maximization display with the fixed aspect ratio in the self-adaptive area by the reference image in the specified position of the self-adaptive area;

wherein ratios of X-axis and Y-axis between the self-adaptive area having a dimension X1, Y1 and the reference image having a dimension X2, Y2 before scaling is computed, and a smaller one of X1/X2 and Y1/Y2 is selected as a scaling ratio based on a center point of the reference image when the reference image is centered; and specified auxiliary constituted data, being data of point, line, and plane with the specified relative position relation of the reference image, is relatively stored with thermal imaging data during recording and processing;

according to the specified relative position relation between the objects acquired by the morphological constituted data and the auxiliary constituted data, one synthesized object is first synthesized, and then a specified position and a specified dimension of the synthesized object located in the infrared thermal image are set, without computing the specified position and the specified dimension of the respective acquired synthesized object in the infrared thermal image; the synthesized object with the specified dimension is continuously synthesized with the infrared thermal image generated by the thermal imaging data acquired according to the specified position, to realize a collective display of the reference image and the infrared thermal image.

43. The normative photographing method for a thermal image according to claim 42, wherein the selecting step is used for selecting the information of the photographed object by selection of options of the information of the photographed object, as a specified number of the options of the information of the photographed object are displayed on a specified position of a display part according to the information of the photographed object stored in the storage part.

44. The normative photographing method for a thermal image according to claim 39, wherein the position determining step is used for responding specified operation to change a position, a dimension, a rotating angle of the reference image located in the infrared thermal image, or a combination thereof, and the recording step is used for recording the infrared data related with at least one of a variation of a displacement, a scaling ratio, and a rotating angle of the reference image after adjustment relative to that before adjustment, position information of the reference image located in the infrared thermal image after adjustment, or position information of an object having specified position relation with the reference image located in the infrared thermal image after adjustment.

45. The normative photographing method for a thermal image according claim 40, wherein the position determining step is used for responding specified operation to change a position, a dimension, a rotating angle of the reference image located in the infrared thermal image, or a combination thereof, and the recording step is used for recording the infrared data related with at least one of a variation of a displacement, a scaling ratio, and a rotating angle of the reference image after adjustment relative to that before adjustment, position information of the reference image located in the infrared thermal image after adjustment, or position information of an object having specified position relation with the reference image located in the infrared thermal image after adjustment.

46. The normative photographing method for a thermal image according to claim 41, wherein the position determining step is used for responding specified operation to change a position, a dimension, a rotating angle of the reference image located in the infrared thermal image, or a combination thereof, and the recording step is used for recording the infrared data related with at least one of a variation of a displacement, a scaling ratio, and a rotating angle of the reference image after adjustment relative to that before adjustment, position information of the reference image located in the infrared thermal image after adjustment, or position information of an object having specified position relation with the reference image located in the infrared thermal image after adjustment.

47. The normative photographing method for a thermal image according to claim 42, wherein the position determining step is used for responding specified operation to change a position, a dimension, a rotating angle of the reference image located in the infrared thermal image, or a combination thereof, and the recording step is used for recording the infrared data related with at least one of a variation of a displacement, a scaling ratio, and a rotating angle of the reference image after adjustment relative to that before adjustment, position information of the reference image located in the infrared thermal image after adjustment, or position information of an object having specified position relation with the reference image located in the infrared thermal image after adjustment.

48. The normative photographing method for a thermal image according to claim 39, wherein the recording step is used for building related record between specified record information and the infrared data, and the specified record information includes at least one type of the following information:

1) information representing the information of the photographed object;
2) the constituted data of the reference image or the constituted data of an object having specified relative position relation with the reference image;
3) position information in the infrared thermal image of the reference image or the object having the specified relative position relation with the reference image;
4) identity information of the constituted data of the reference image or identity information of the constituted data of the object having the specified relative position relation with the reference image.

49. The normative photographing method for a thermal image according to claim 40, wherein the recording step is used for building related record between specified record information and the infrared data, and the specified record information includes at least one type of the following information:

1) information representing the information of the photographed object;
2) the constituted data of the reference image or the constituted data of an object having specified relative position relation with the reference image;
3) position information in the infrared thermal image of the reference image or the object having the specified relative position relation with the reference image;
4) identity information of the constituted data of the reference image or identity information of the constituted data of the object having the specified relative position relation with the reference image.

50. The normative photographing method for a thermal image according to claim 41, wherein the recording step is used for building related record between specified record information and the infrared data, and the specified record information includes at least one type of the following information:

1) information representing the information of the photographed object;
2) the constituted data of the reference image or the constituted data of an object having specified relative position relation with the reference image;
3) position information in the infrared thermal image of the reference image or the object having the specified relative position relation with the reference image;
4) identity information of the constituted data of the reference image or identity information of the constituted data of the object having the specified relative position relation with the reference image.

51. The normative photographing method for a thermal image according to claim 42, wherein the recording step is used for building related record between specified record information and the infrared data, and the specified record information includes at least one type of the following information:

1) information representing the information of the photographed object;
2) the constituted data of the reference image or the constituted data of an object having specified relative position relation with the reference image;
3) position information in the infrared thermal image of the reference image or the object having the specified relative position relation with the reference image;
4) identity information of the constituted data of the reference image or identity information of the constituted data of the object having the specified relative position relation with the reference image.

52. The normative photographing method for a thermal image according to claim 43, wherein the recording step is used for building related record between specified record information and the infrared data, and the specified record information includes at least one type of the following information:

1) information representing the information of the photographed object;
2) the constituted data of the reference image or the constituted data of an object having specified relative position relation with the reference image;
3) position information in the infrared thermal image of the reference image or the object having the specified relative position relation with the reference image;
4) identity information of the constituted data of the reference image or identity information of the constituted data of the object having the specified relative position relation with the reference image.

* * * * *